United States Patent
Liu

(10) Patent No.: US 11,751,253 B2
(45) Date of Patent: Sep. 5, 2023

(54) RANDOM ACCESS FOR BROADBAND 4G AND 5G OVER SATELLITE

(71) Applicant: LOCKHEED MARTIN CORPORATION, Bethesda, MD (US)

(72) Inventor: Xiangdong Liu, Boyds, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 302 days.

(21) Appl. No.: 17/185,781

(22) Filed: Feb. 25, 2021

(65) Prior Publication Data
US 2022/0272757 A1   Aug. 25, 2022

(51) Int. Cl.
| H04B 7/185 | (2006.01) |
| H04W 74/08 | (2009.01) |
| H04W 74/00 | (2009.01) |
| G01S 19/27 | (2010.01) |
| H04B 7/195 | (2006.01) |
| H04L 27/26 | (2006.01) |
| H04W 84/06 | (2009.01) |

(52) U.S. Cl.
CPC ......... *H04W 74/0833* (2013.01); *G01S 19/27* (2013.01); *H04B 7/18554* (2013.01); *H04B 7/195* (2013.01); *H04L 27/2607* (2013.01); *H04W 74/008* (2013.01); *H04W 84/06* (2013.01)

(58) Field of Classification Search
CPC combination set(s) only.
See application file for complete search history.

(56) References Cited

U.S. PATENT DOCUMENTS

| 6,570,859 | B1 | 5/2003 | Cable |
| 9,402,176 | B2 | 7/2016 | Wang |
| 9,930,613 | B2 | 3/2018 | Starsinic |
| 9,991,587 | B1 * | 6/2018 | Freedman ............. H01Q 15/16 |
| 10,547,374 | B1 | 1/2020 | Liu |
| 2002/0041328 | A1 | 4/2002 | LeCompte |
| 2004/0185775 | A1 | 9/2004 | Bell |
| 2008/0159419 | A1 | 7/2008 | Smith |
| 2010/0068993 | A1 | 3/2010 | Khan |
| 2010/0280907 | A1 | 11/2010 | Wolinsky et al. |
| 2012/0058791 | A1 | 3/2012 | Bhattad |
| 2012/0063302 | A1 | 3/2012 | Damnjanovic |
| 2012/0154055 | A1 | 6/2012 | Yamamoto |

(Continued)

FOREIGN PATENT DOCUMENTS

| EP | 2793530 | 10/2014 |
| KR | 2013-0125280 | 11/2013 |

(Continued)

OTHER PUBLICATIONS

3GPP, Non-Access Startun (NAS) Protocol for Evolved Packet Systems (EPS); Stage 3 (Release 14, Dec. 2016, 3Gpp, Version 14.2.0, 470 pgs.

*Primary Examiner* — Guang W Li
(74) *Attorney, Agent, or Firm* — BAKERHOSTETLER

(57) ABSTRACT

Systems and methods for communication in 4G and 5G broadband satellite networks are provided. The disclosed methods include Global Navigation Satellite System (GNSS)-independent methods, and GNSS assisted methods that do not require transmission of satellite ephemeris information from a base station to user equipment.

18 Claims, 15 Drawing Sheets

(56) References Cited

U.S. PATENT DOCUMENTS

| | | |
|---|---|---|
| 2013/0195002 A1 | 8/2013 | Walker |
| 2013/0336256 A1 | 12/2013 | Chung |
| 2014/0226502 A1 | 8/2014 | Behnamfar |
| 2014/0293937 A1 | 10/2014 | Lee |
| 2015/0071169 A1 | 3/2015 | Wang |
| 2015/0311931 A1* | 10/2015 | Rozental ............... H04B 1/709 375/343 |
| 2015/0319567 A1 | 11/2015 | Edge |
| 2015/0327328 A1* | 11/2015 | Novak ................. H04W 88/04 455/11.1 |
| 2016/0192277 A1 | 6/2016 | Sarsinic |
| 2016/0219569 A1 | 7/2016 | Kuo |
| 2016/0241325 A1 | 8/2016 | Raghothaman |
| 2016/0366687 A1 | 12/2016 | Guo |
| 2017/0019882 A1 | 1/2017 | Nimbalker et al. |
| 2017/0019914 A1* | 1/2017 | Rune ................. H04W 72/1268 |
| 2017/0041830 A1* | 2/2017 | Davis ................. H04B 7/1851 |
| 2017/0094512 A1 | 3/2017 | Kiss |
| 2017/0195930 A1 | 7/2017 | Tomici |
| 2017/0332416 A1 | 11/2017 | Kiss |
| 2018/0092157 A1 | 3/2018 | Chen |
| 2018/0146445 A1 | 5/2018 | Lee |
| 2018/0227752 A1 | 8/2018 | Teyeb |
| 2018/0270703 A1 | 9/2018 | Kodali |
| 2018/0295651 A1 | 10/2018 | Cao |
| 2018/0352547 A1 | 12/2018 | Tabet |
| 2018/0376384 A1 | 12/2018 | Youn |
| 2019/0052603 A1 | 2/2019 | Wu |
| 2019/0124561 A1 | 4/2019 | Faccin |
| 2020/0205108 A1* | 6/2020 | Alasti ............... H04W 74/0833 |
| 2020/0351918 A1* | 11/2020 | Wang ................. H04W 72/046 |
| 2021/0345398 A1* | 11/2021 | Cao ................. H04W 56/0055 |
| 2022/0007323 A1* | 1/2022 | Li ....................... H04B 7/1851 |
| 2022/0150858 A1* | 5/2022 | Ren ................. H04W 74/0833 |
| 2022/0200695 A1* | 6/2022 | Ren ................. H04B 7/18513 |
| 2022/0264502 A1* | 8/2022 | Liu ....................... H04W 24/08 |
| 2022/0393957 A1* | 12/2022 | Wang ................. H04W 56/0045 |
| 2023/0015434 A1* | 1/2023 | Liu ....................... C21C 5/4606 |
| 2023/0104479 A1* | 4/2023 | Ma ..................... H04W 56/006 370/503 |

FOREIGN PATENT DOCUMENTS

| | | |
|---|---|---|
| KR | 2013-0125281 | 11/2013 |
| KR | 2016-0053562 | 5/2016 |
| WO | WO 2013/086917 | 6/2013 |
| WO | WO 2013/168872 | 11/2013 |
| WO | WO 2013/168880 | 11/2013 |
| WO | WO 2017/045123 | 3/2017 |

* cited by examiner

| Format | CP (msec) | Sequence (msec) | GP (msec) | PRACH Slot (msec) | Max Cell Size (km) |
|---|---|---|---|---|---|
| 0 | 0.103 | 0.800 | 0.097 | 1 | ~14 |
| 1 | 0.684 | 1.600 | 0.716 | 3 | ~102 |
| A3, μ = 0 | 0.028 | 0.4 | 0.572 | 1 | ~4.2 |
| A3, μ = 3 | 0.0035 | 0.050 | 0.071 | 0.125 | ~0.5 |
| C2, μ = 1 | 0.033 | 0.133 | 0.333 | 0.5 | ~5 |

RANDOM ACCESS FOR BROADBAND 4G AND 5G OVER SATELLITE

STATEMENT REGARDING FEDERALLY SPONSORED RESEARCH OR DEVELOPMENT

Not applicable

FIELD OF THE INVENTION

The present invention generally relates to satellite communications, and more particularly, to random access for fourth generation (4G) and fifth generation (5G) mobile network communications over satellite.

BACKGROUND

The wireless industry and the satellite industry are moving to provide 4G and 5G services over satellite, in addition to current terrestrial 4G and 5G networks. Satellite implementations of 4G and 5G networks may be desirable, for example, for geographic areas where it is not feasible or economical to deploy ground-based infrastructure. However, various challenges arise when attempting to implement terrestrial 4G and 5G operations in a satellite environment.

SUMMARY

Random access is a procedure in a 4G network (e.g., a Long Term Evolution (LTE) or Long Term Evolution for Machines (LTE-M) network) or a 5G network (e.g., a New Radio (NR), enhanced Machine Type Communication (eMTC), or Reduced Capability New Radio (RedCap) network) for time-synchronization of user equipment (UE) to the system in uplink (UE-to-base station). After a random access procedure in a terrestrial 4G or 5G network, the UE can transmit signals to a base station (BS), such as a gNodeB or eNodeB, such that the signals arrive at the BS at time instances that are expected by the BS and without colliding in time with transmissions by other UEs. In order to implement a satellite system providing 4G and/or 5G service, a random access procedure is desirable, and it may be preferable that the 4G or 5G random access signal formats are unchanged (e.g., to avoid modifications to other portions of the system and/or to maintain compatibility with terrestrial 4G and/or 5G networks). For example, according to various aspects of the subject technology, it can be beneficial to use portions of terrestrial 4G or 5G technologies in a satellite environment to allow reuse of products and parts to lower development and operational costs.

In a terrestrial 4G or 5G random access procedure, a UE transmits a Physical Random Access Channel (PRACH) preamble to a BS. The BS processes the preamble to determine the time delay to the UE, and then notifies the UE of that delay, the delay being referred to as timing advance (TA). The UE then adjusts its subsequent transmissions to the BS by the value of TA, with the result that the transmissions arrive at the BS at time instances expected by the base station, while staying clear in time of transmissions by other UEs.

In a terrestrial 4G or 5G system, the random access procedure is designed to work with a time delay range in a cell of maximum radius of about 100 km, with many configurations (e.g., for high bandwidth and high data rates) for handling smaller time delay ranges and thus smaller cell sizes. However, in a satellite system, the time delays can be much larger, can have a wider range due to the altitude of satellite and a large beam size, and can be uncertain and/or time-dependent due to the location and/or motion of the satellite.

One possible modification for satellite systems (e.g., to handle the large time delay and wide delay range of the satellite system) is that used in DVB-S2(x) satellite systems. In such systems, a UE has an embedded Global Navigation Satellite System (GNSS) receiver such as a Global Positioning System (GPS) receiver. In such systems, a BS transmits satellite ephemeris as system information to the UEs. The UE is then able to calculate its time delay to the satellite, using its own GNSS position and that of satellite, and to adjust its transmission timing of a PRACH preamble accordingly. The BS may adjust its own transmission or reception timing to accommodate its time delay to the satellite or broadcast the BS-satellite time delay to all UEs for UEs to account for this time delay in their PRACH transmission timing. In this way, the ephemeris information transmitted to the UE by the satellite can be used so that the PRACH preamble arrives at BS with a small residual time delay error that can be resolved by the BS.

However, in certain systems it may be desirable for a UE to perform uplink acquisition without the use of a GNSS receiver. For example, a GNSS receiver may not be included in some UEs (e.g., low cost UEs), such as internet of things (IoT) devices. Further, even for devices with GNSS receivers, the GNSS receiver consumes additional power at the UE, which can undesirably shorten battery life. Moreover, the GNSS receiver may take time to establish a position (e.g., time to first fix, TTFF), that may delay the transmission and reception of user data by the UE. In some scenarios, a GNSS signal can be unusable due to interference. There is thus a need for a random access method for 4G and/or 5G satellite systems that does not depend on GNSS capabilities at the UEs.

In accordance with aspects of the disclosure, GNSS-independent random access systems and methods are disclosed, to provide random access for 4G and/or 5G satellite systems, without relying on GNSS capabilities at the UEs.

Moreover, for UEs that include embedded GNSS receivers, transmitting satellite ephemeris adds overhead to the use of precious service link spectrum. For example, satellite position and velocity vectors for one time instance may take a minimum of 168 bits, and an orbit description in TLE format may take a minimum of 880 bits. Satellite ephemeris may also be transmitted at short periodicity (e.g. once every 1.28 seconds), such that a UE does not need to wait for a long time to receive the ephemeris information to then be able to synchronize to the system. Accordingly, there is also a need for a random access method for GNSS-enabled devices, but that does not depend on the transmission of satellite ephemeris information.

In accordance with aspects of the disclosure, GNSS-assisted random access systems and methods are also disclosed, to provide random access for 4G and/or 5G satellite systems, without relying on satellite ephemeris information.

As discussed in further detail hereinafter, various implementations of the GNSS-independent random accesses systems and methods and various implementations of the GNSS-assisted random access systems and methods are disclosed for deployment in LTE, LTE-M, NR, eMTC, RedCap, and/or similar radio access networks that implement one or more satellites. The satellite(s) in any of these networks may include any of a Geosynchronous Equatorial Orbit (GEO) satellite or a Non-Geo Synchronous Orbit (NGSO) satellite, such as a Medium Earth Orbit (MEO) satellite, a Highly Elliptical Orbit (HEO) satellite, or a Low Earth Orbit (LEO) satellite.

In one or more other aspects, a method is provided for communication in a broadband satellite network that includes a base station and a satellite. The method includes determining, by the base station, a minimum delay for receipt of uplink signals from terminal devices, the minimum delay based in part on an error value corresponding to an ephemeris accuracy for the satellite. The method also includes delaying, at the base station, uplink receive slots relative to corresponding downlink transmit slots by the minimum delay. The method also includes receiving an acquisition signal from a particular terminal device at the base station via the satellite in one of the delayed uplink receive slots. The method also includes determining, at the base station, a differential delay for the particular terminal device based on the received acquisition signal. The method also includes providing the differential delay to the particular terminal device. The method also includes receiving subsequent communications from the particular terminal device, the subsequent communications having been transmitted advanced in time based on the differential delay provided by the base station.

In one or more other aspects, a method is provided for communication in a broadband satellite network that includes a base station, a terminal device, and a satellite. The method includes receiving, at the terminal device from the base station, a quantity corresponding to a minimum delay for transmission of uplink signals from the terminal device, the minimum delay based in part on an error value corresponding to an ephemeris accuracy for the satellite. The method also includes storing the received quantity and a time of reception of the received quantity. The method also includes determining the minimum delay using the received quantity. The method also includes transmitting an acquisition signal to the base station via the satellite at a transmission time that is advanced by the minimum delay. The method also includes receiving, from the base station and responsive to the acquisition signal, a differential delay for the terminal device. The method also includes transmitting subsequent communications from the terminal device to the base station via the satellite in uplink transmit slots that are advanced by the minimum delay and the differential delay.

In yet one or more other aspects, a method is provided for communication in a broadband satellite network that includes a base station, a terminal device, and a satellite. The method includes receiving, at the terminal device from the base station via the satellite, a downlink frame. The method also includes determining, at the terminal device, an arrival time of the downlink frame. The method also includes determining, at the terminal device, a transmission time of the downlink frame using global positioning system information associated with the downlink frame. The method also includes determining a timing advance based on the arrival time, the transmission time, and an error corresponding to an ephemeris accuracy of the satellite. The method also includes advancing subsequent communications from the terminal device to the base station via the satellite by the timing advance.

In one or more implementations, advancing the subsequent communications includes transmitting, from the terminal device via the satellite to the base station, an acquisition signal advanced by the timing advance. In one or more implementations, timing advance is a first timing advance. In one or more implementations, the method also includes performing acquisition signal processing at base station (e.g., in the same manner as in a terrestrial network) to generate a second timing advance using the received acquisition signal, and the terminal device receiving the second timing advance from the base station. The method may also include advancing subsequent communications by the terminal device with the base station via the satellite by the first timing advance and the second timing advance.

In one or more other aspects, a method for communication in a broadband satellite network comprising a base station, a terminal device, and a satellite is provided, the method including receiving, at the terminal device from the base station via the satellite, a downlink frame. The method also includes determining, at the terminal device, an arrival time of the downlink frame. The method also includes determining, at the terminal device, a transmission time of the downlink frame using the arrival time of the downlink frame, and using a convention, previously established with the base station, relating system frame numbers (SFNs) to a Global Navigation Satellite System (GNSS) time epoch. The method also includes determining a timing advance based on the arrival time, the transmission time, and an error term corresponding to a terminal device GNSS receiver timing accuracy of the terminal device and a motion of the satellite. The method also includes advancing subsequent communications from the terminal device to the base station via the satellite by the timing advance.

In one or more aspects, a method is provided for communication with a terminal device in a terrestrial broadband network comprising a base station, the method including performing, iteratively at the base station in each of several successive and partially overlapping observation windows that are separated by a length corresponding to a cyclic prefix of a PRACH preamble, a PRACH preamble detection operation. The method also includes receiving a PRACH preamble from the terminal device, the PRACH preamble partially filling one or more of the observation windows and entirely filling one of the observation windows. The method also includes determining a differential delay corresponding to the terminal device based on the one of the observation windows that is entirely filled with the PRACH preamble. The method also includes performing subsequent communications between the base station and the terminal device, in part, using the determined differential delay.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1A:
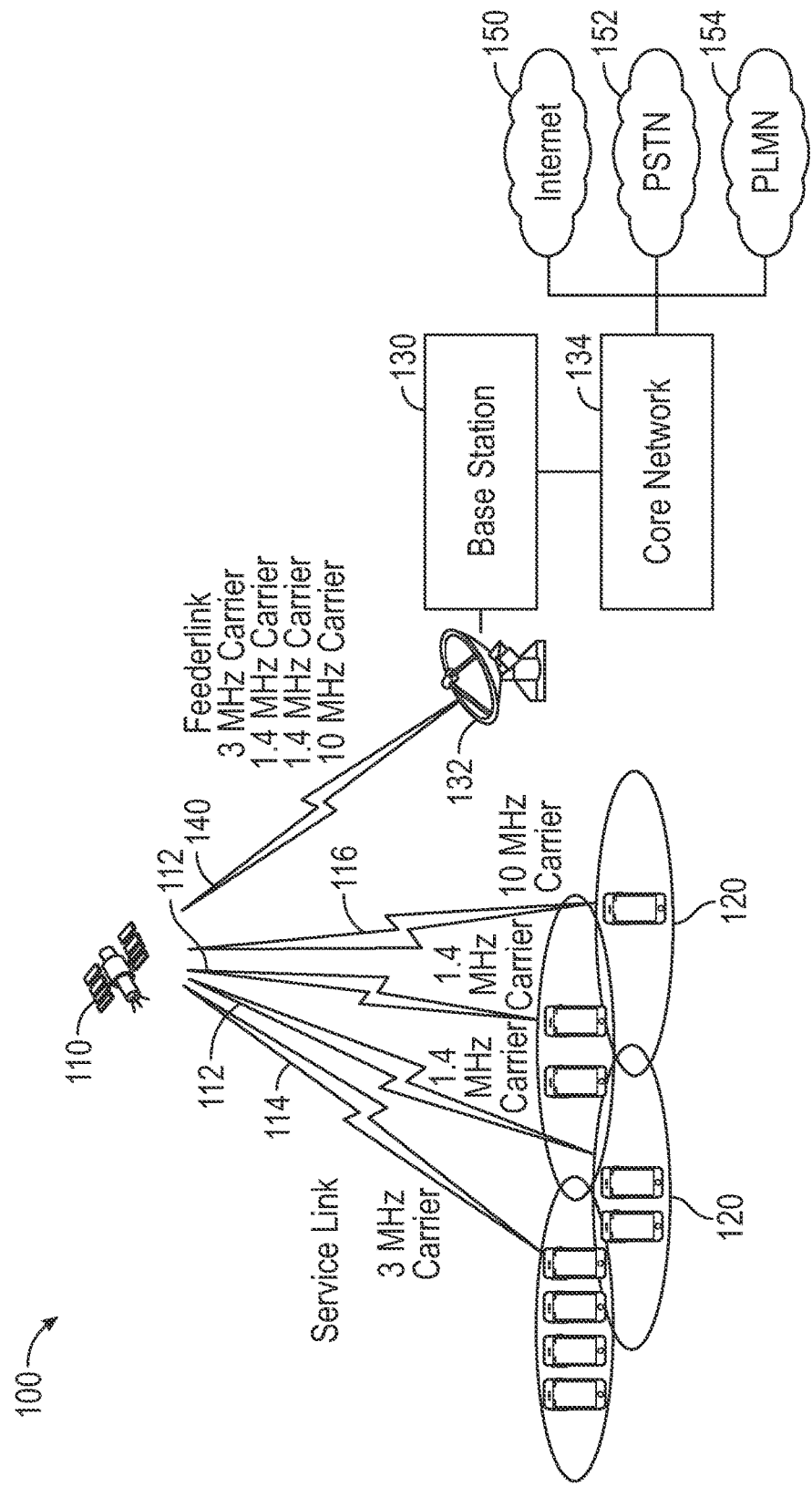
FIGS. 1A-1C is are diagrams illustrating respective example environments for deployment of a satellite system with random access, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In accordance with aspects of the disclosure, various methods are disclosed that can be performed for acquisition in a 4G or 5G over satellite network. These methods include GNSS-independent random access methods that can be performed by a base station (BS), GNSS-independent random access methods that can be performed by user equipment (UE, also referred to herein as a terminal device), and a GNSS-assisted random access method that can be performed by a UE without the use of or access to satellite ephemeris information at the UE.

Each of the disclosed methods has variants described in further detail hereinafter for use by transparent payload satellites or processing payload satellites. Each of the disclosed includes variants as described herein can be applied in implementations with different satellite orbit types, including Geostationary Earth Orbits (GEO) with inclined orbit, Medium Earth Orbit (MEOs), Highly Elliptical Orbits (HEOs), and Low Earth Orbits (LEOs).

Each of the GNSS-independent methods and their variants disclosed herein include a first aspect associated with a minimum delay (e.g., a minimum delay time), and a second aspect associated with a differential delay. As described in further detail hereinafter, the minimum delay is associated with the arrangement of a base station, a satellite, and/or a satellite beam, and an ephemeris accuracy associated with the satellite. The differential delay is associated a position of a particular terminal device within a beam or cell. As described in further detail hereinafter, the variants of the GNSS-independent methods include variants for transparent payload satellites that pass information for processing at a terrestrial base station, variants for processing payload satellites that process information at the satellite, variants for UE handling of delays, and variants for base station handling of delays.

As described in further detail hereinafter, the GNSS-assisted method includes determining, at a terminal device, a transmission time of a downlink frame using global positioning system information associated with the downlink frame, and determining a timing advance based on an arrival time and the transmission time of the downlink frame, and an error corresponding to an ephemeris accuracy of the satellite.

FIG. 1A is a high-level diagram illustrating an example environment 100 for deployment of a satellite system with broadband 4G (e.g., LTE or LTE-M) technology or broadband 5G (e.g., NR, eMTC, or RedCap) technology, according to certain aspects of the disclosure. In the example of FIG. 1A, 4G terminology and quantities are used for illustrative purposes. In the example of FIG. 1A, the environment 100 includes a space vehicle (e.g., a satellite) 110, various terminal devices such as terminals 120, a multi-cell satellite base station 130 (e.g., eNodeB (eNB), gNodeB (gNB)), the ground station antenna 132 (e.g., a reflector antenna, such as a dish antenna), and a core network 134. The core network 134 is communicatively coupled to a number of networks such as the Internet 150, the public switched telephone network (PSTN) 152 and the public land mobile network (PLMN) 154. The core network 134 is, for example, a 4G or 5G air interface used by a service provider.

The terminal devices, also referred to as terminals 120, or UEs, are coupled to the satellite 110 via a number of 4G or 5G communication channels such as 4G channels 112 (e.g., 1.4 MHz carrier channel), 114 (e.g., 3 MHz carrier channel), and 116 (e.g., 10 MHz). In the example of FIG. 1A, the satellite base station (BS) 130 is coupled to the ground station antenna 132 that communicates with the satellite 110 via a feederlink 140. The satellite BS 130 can transmit, for example, at least one downlink OFDMA carrier paired with an uplink SC-FDMA carrier in each of one or more satellite beam (cells). In each beam (cell), there may be zero, one, or more user terminals 120 (also referred to herein as terminal devices). On the service link (to end-users), radio carriers may be in, for example, L-band (e.g., about 1-2 GHz) or S-band (e.g., about 2-4 GHz), and on the feederlink side, carriers may be in, for example, C-band (e.g., about 4-8

GHz) or Ku-band (e.g., about 12-18 GHz). For instance, the feederlink 140 may support a number of carriers, for example, two 1.4 MHz, one 3 MHz, and one 10 MHz carriers. As discussed above, in the example of FIG. 1A, 4G terminology and quantities are used, and the satellite base station 130 is a ground-based base station that is separate from the satellite 110. However, this is merely illustrative, including the spectral bands that such a system may use on user link and on feederlink.

Figure 1B:
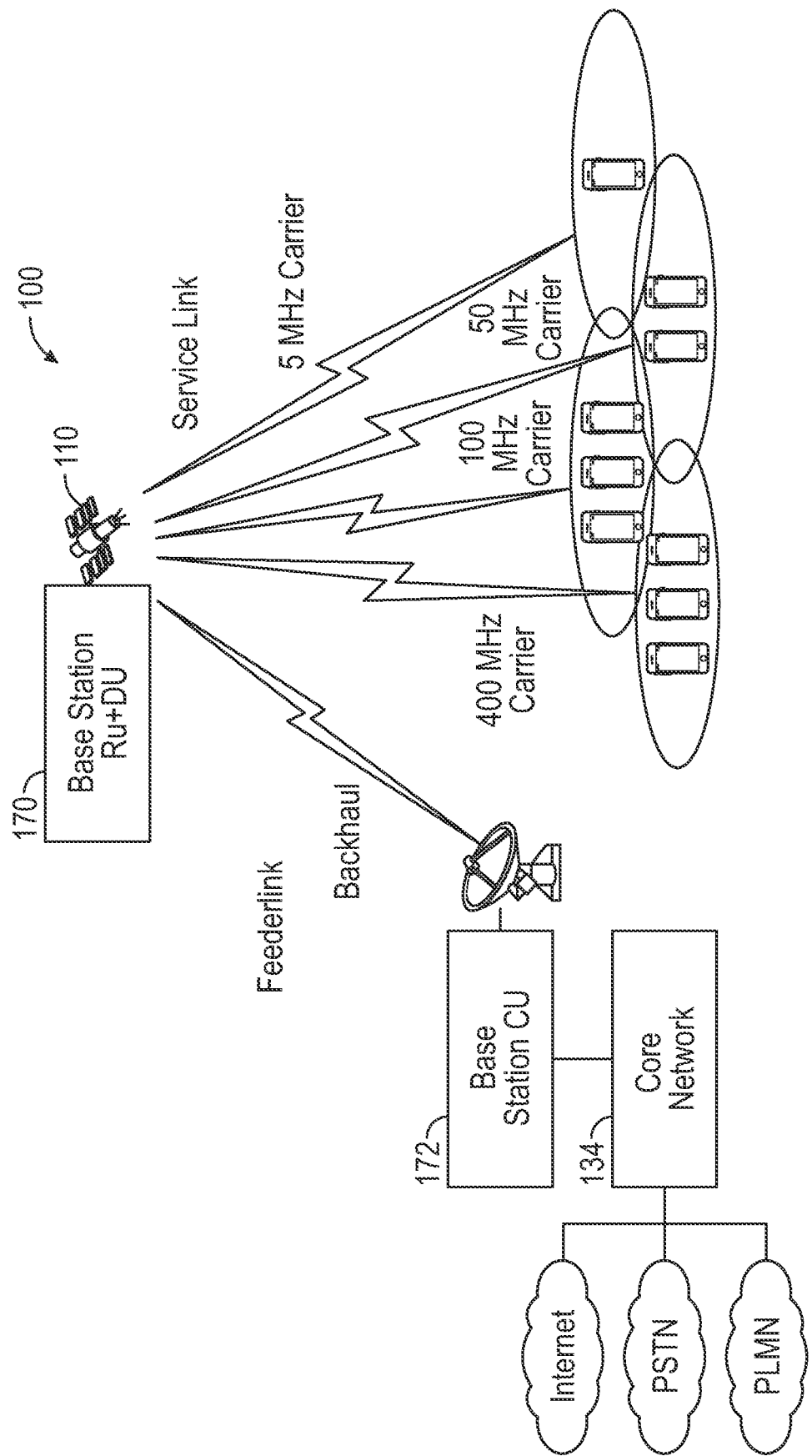
Figure 1C:
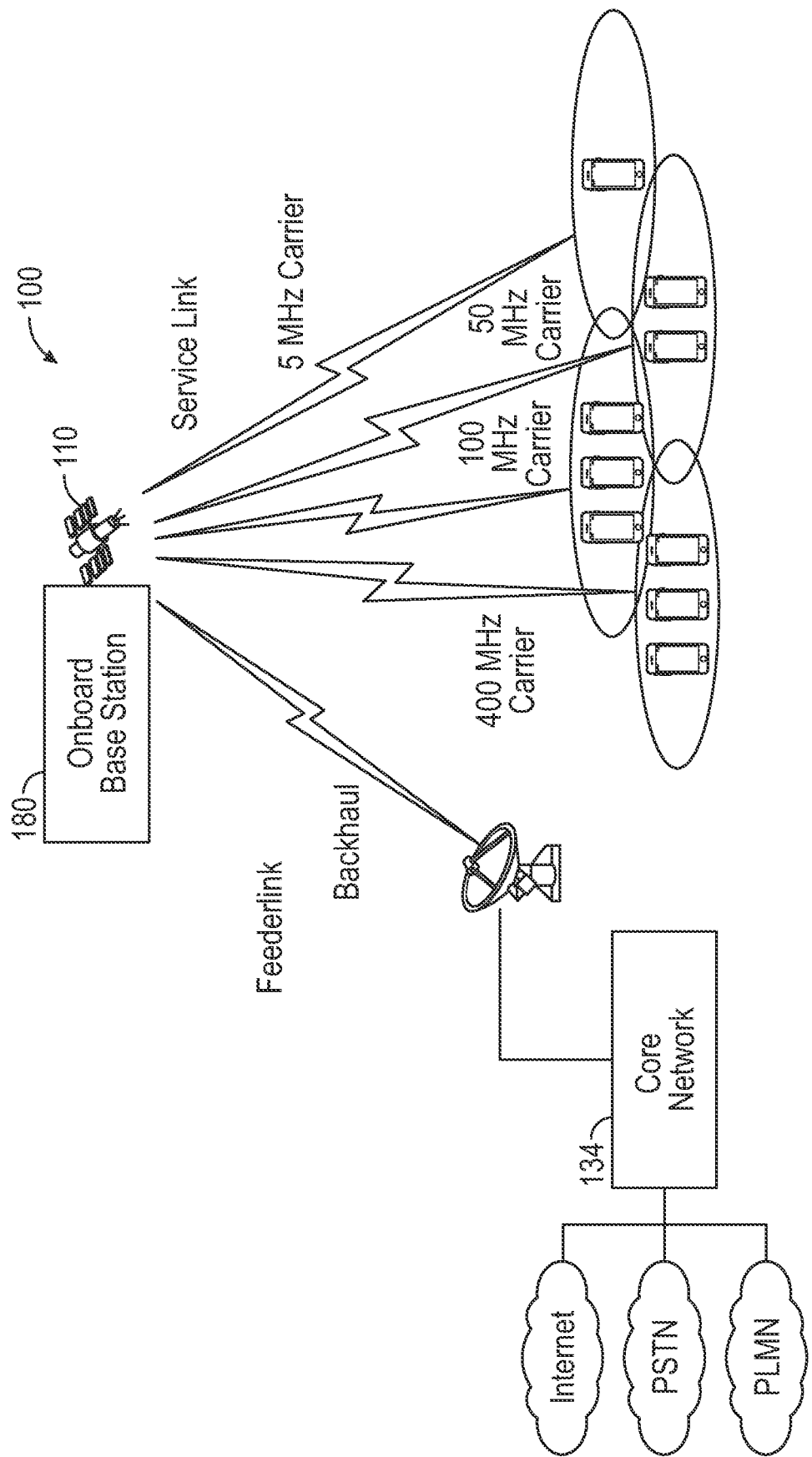

As shown in FIG. 1B, in one or more implementations, the system of environment 100 may include a split base station that includes an onboard partial base station 170 (e.g., the portion of the base station that includes the radio unit (RU) and distributed unit (DU), referred to in FIG. 1B as base station RU+DU 170) at the satellite 110, and a ground-based portion 172 (e.g., the portion of the base station that includes the central unit (CU), referred to in FIG. 1B and base station CU 172) that is ground-based and separate from the satellite. FIG. 1C shows another example implementation of the environment 100 in which the entire base station is an onboard base station 180 at the satellite 110. In the examples of FIGS. 1B and 1C, 5G terminology and quantities are used for illustrative purposes.

In one or more implementations, it may be advantageous to reuse as much as possible the terrestrial 4G or 5G design in 4G or 5G over satellite implementations, and to make modifications only when necessary to fit to the satellite environment. Doing so allows maximal reuse of terrestrial equipment and product components and minimizes system development and deployment cost.

As in terrestrial 4G or 5G, a terminal 120 may be time synchronized with the satellite base station 130, onboard partial base station 170, or onboard base station 180 in the return (terminal-to-satellite base station) direction, to be able to transmit information to the satellite base station 130, onboard partial base station 170, or onboard base station 180. For time synchronization, the terminal 120 first obtains and then maintains information of the precise time delay between itself and the satellite base station 130. With the precise time delay information, the terminal 120 can subsequently determine the precise instance of time to start transmitting a burst to the satellite base station 130 such that the burst arrives at the satellite base station 130 at a time that the satellite base station 130 expects the burst from the particular terminal, and the burst does not overlap with bursts from other terminals that use the same frequency.

In some aspects, the subject technology provides GNSS-independent acquisition methods and GNSS-assisted acquisition methods that are applicable to the system of environment 100 of any of FIGS. 1A, 1B, and/or 1C. The acquisition methods allow a user terminal (e.g., 120) to obtain its delay to the satellite base station (e.g., 130), while preserving the 4G or 5G channelization and time frame structures, and making a few changes to the processing at the satellite base station 130 and at the terminal 120, as discussed in further detail herein.

Figure 2A:
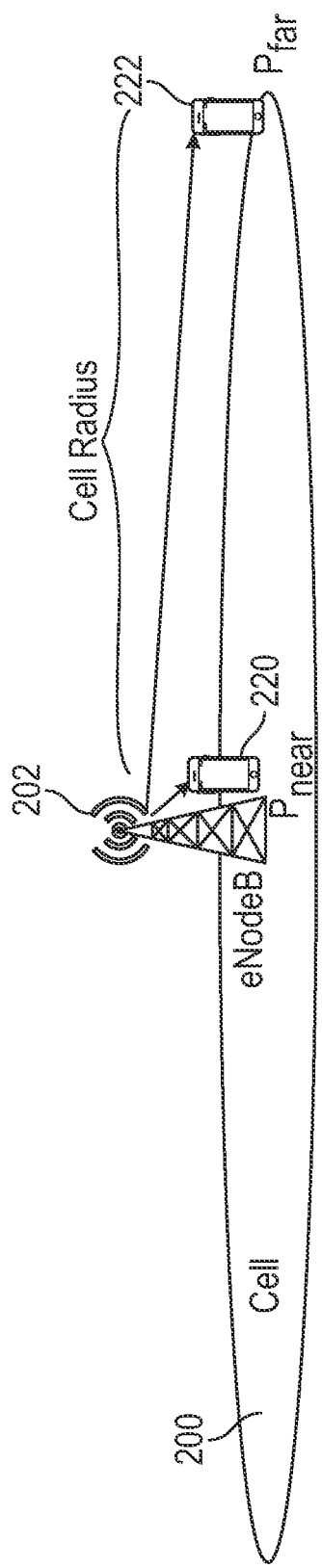
FIGS. 2A-2B are diagrams illustrating examples of differential delays within terrestrial network cells, according to certain aspects of the disclosure.

FIG. 2A is a diagram illustrating an example of differential delay within a terrestrial cell. As shown in FIG. 2A, a terminal 220 (e.g., at Pnear) obtains the delay between itself and a base station transmit/receive point (TRP) 202 through a process called acquisition. The acquisition mechanism specified in the 3GPP standards, such as LTE, LTE-M, NR, eMTC, and RedCap, allows for a delay of between 0 and about 0.34 msec. For this reason, the maximum a cell radius for the base station TRP 202 centered in the cell 200 and supported by terrestrial LTE is about 100 km (0.34 msec* (speed of light) 300 km/msec). The highest differential delay between two terminals (e.g., 220 and 222 (at Pfar)) can be as large as 0.33 msec.

Figure 2B:
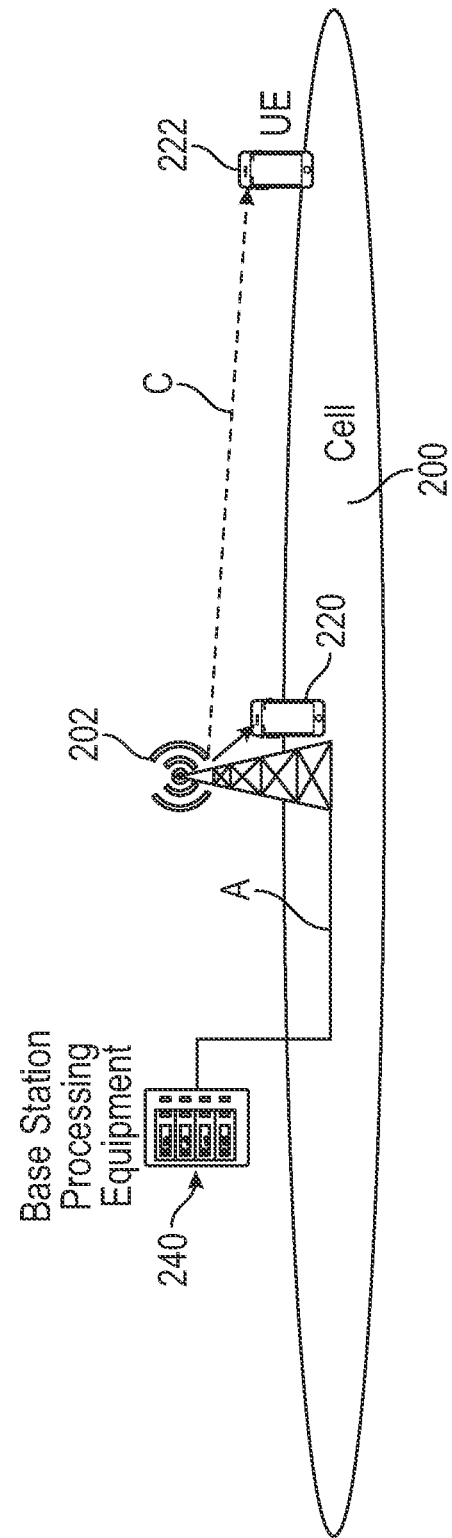

In the example, of FIG. 2A, the time delay from a terminal anywhere in a cell to the corresponding base station can be regarded as a differential delay between the time delay of the terminal in question and the time delay of a terminal located at the base station. As shown in FIG. 2B, in some systems, base station processing equipment 240 may be separate from the base station transmit/receive point (TRP), 202 (e.g., a base station tower). In the arrangement of FIG. 2B, the differential delay is denoted "C", and an additional delay, denoted "A" may be introduced by the separation of the base station processing equipment 240 and the base station TRP 202. The delay A may be a minimum time delay (also referred to herein as a minimum delay) for the system of FIG. 2B, and may be independent of the positions of the terminals.

Figure 3A:
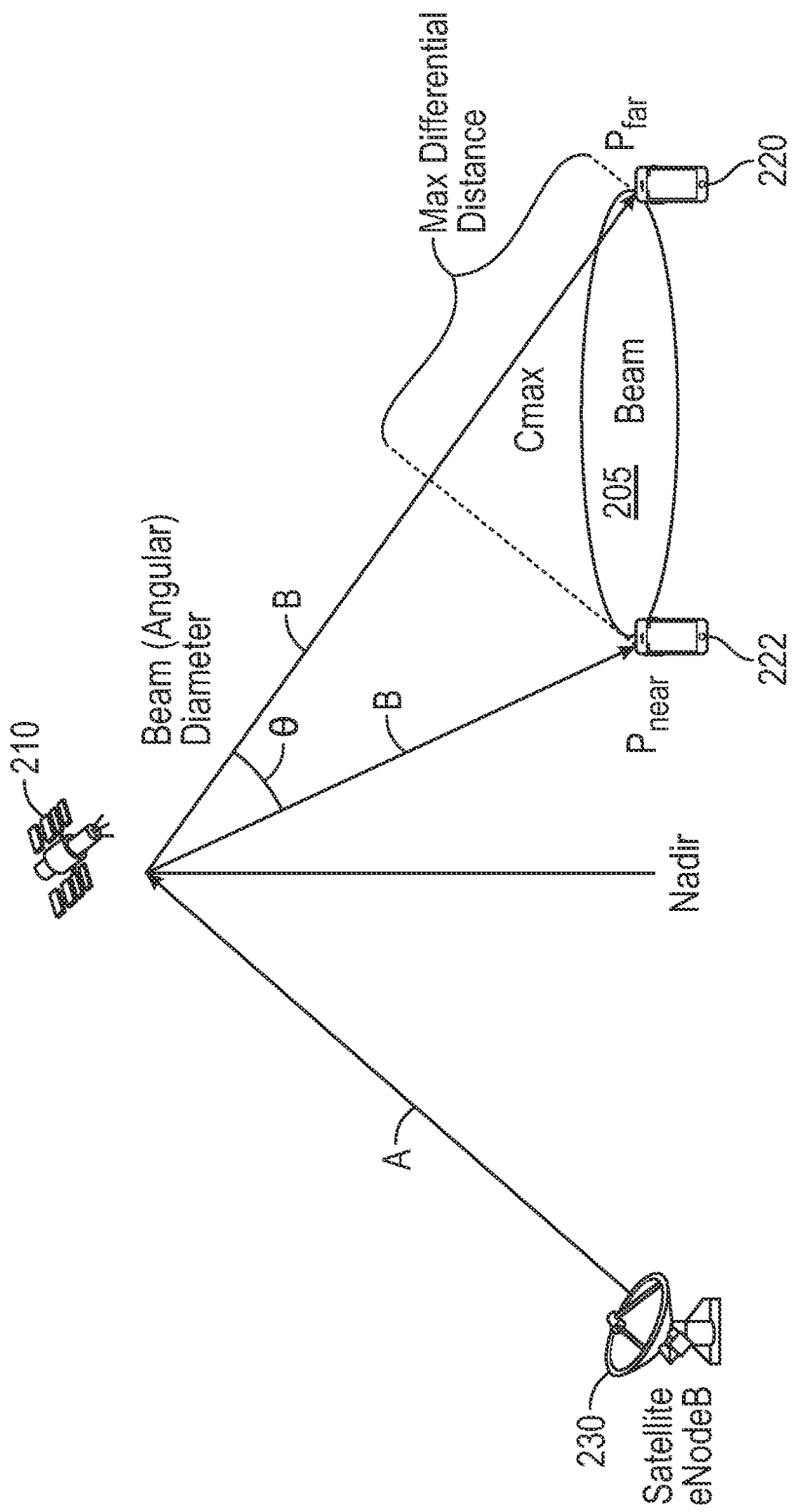
FIGS. 3A-3B are diagrams illustrating examples of differential delays within satellite communication beams, according to certain aspects of the disclosure.

In a mobile satellite communications system, as shown in FIG. 3A, the differential delay between users (e.g., 222 and 220) in a beam (cell) 205 can be significantly larger than in the terrestrial networks of FIGS. 2A and 2B. The highest differential delay (denoted Cmax) within a beam 205 can be a function of the beam size, distance of beam center to the satellite nadir, and satellite altitude. The diagram shown in FIG. 3A is a simplified representation without showing the effect of earth curvature. The diagram shows a satellite 210 (e.g., a GEO, MEO, HEO, or LEO satellite) that communicates with a ground station antenna 230 and a number of terminals (e.g., 220 and 222). In one or more implementations the satellite 210 may be a GEO satellite that can maintain its orbit with near 0 degree inclination, and with an example beam size (θ) of about 1 degree angular diameter (e.g., measured at the satellite towards earth). In this example, the maximum differential delay can be shown to be about 2.84 msec within a beam centered at about 45 degree latitude and at the same longitude as that of the satellite. Even with a much smaller beam size of 0.2 degree diameter, a beam centered at 50 degree latitude and same satellite longitude leads to a maximum differential delay of 0.70 msec.

To conserve fuel for station keeping, a GEO communications satellite for mobile users is typically operated to allow the orbit to be inclined over the life of the satellite, for example, by as much as 7 degrees (in the North-South direction). With this orbit inclination, the maximum differential delay is about 3.92 msec within a beam of 1 degree diameter that is centered at 45 degrees latitude and at the same longitude as that of the satellite. Even with a diameter of 0.2 degrees, a beam centered at 50 degree latitude and same satellite longitude still has a maximum differential delay of 0.97 msec.

Figure 3B:
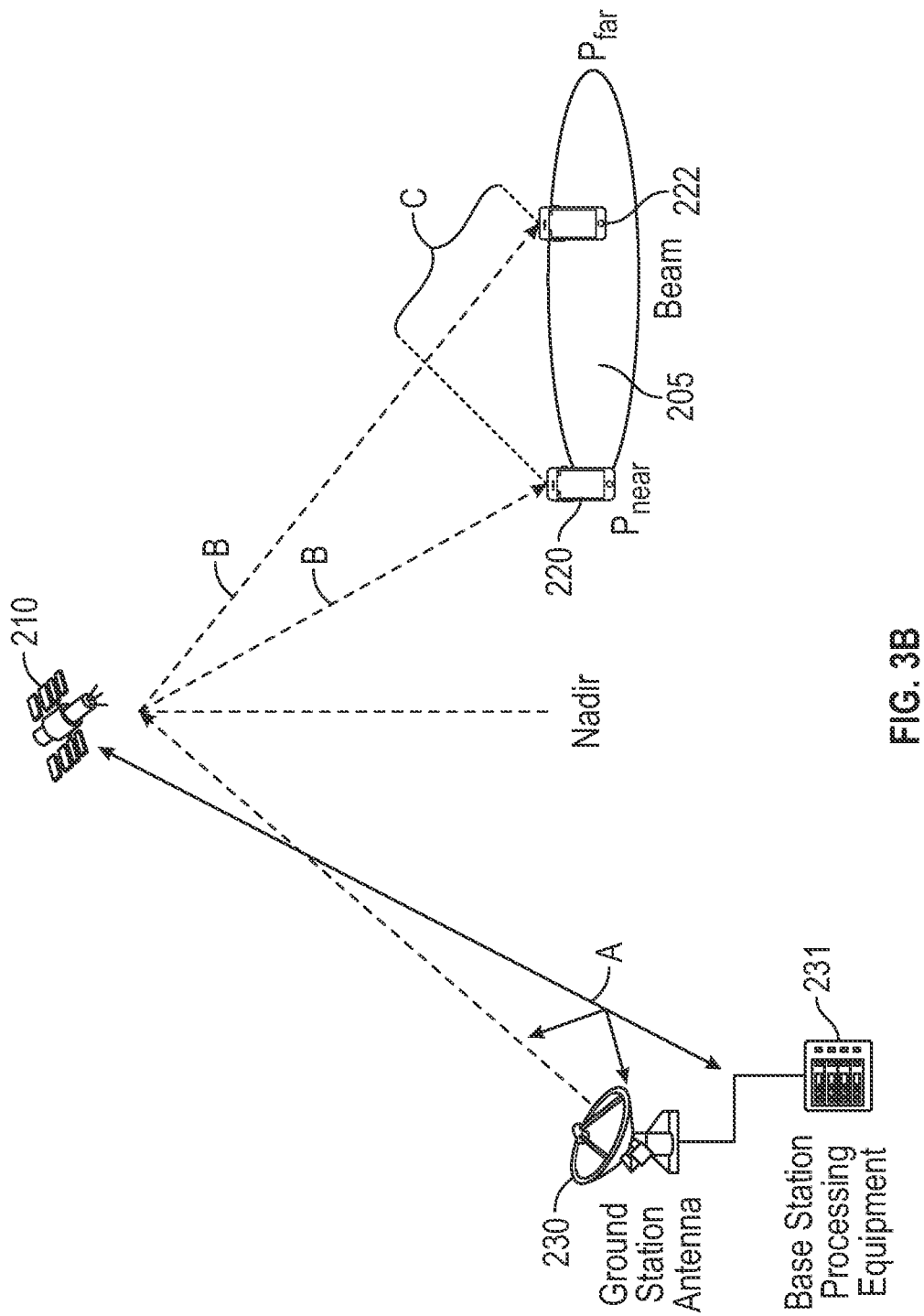

In the example of FIG. 3A, base station processing is performed at the ground station antenna 230 (e.g., in a transparent payload implementation). And the minimum delay for communication between the base station and the terminals includes a component A due to the separation between the base station and the satellite 210, and a component B due to the separation between the satellite 210 and the terminals, which depends on the satellite beam. However, it should be appreciated that, in processing payload implementations in which a portion of or the entire base station is disposed at the satellite 210, the minimum delay may include only the component B. FIG. 3B also shows another transparent payload implementation in which the base station processing is performed by base station processing equipment 231 that is separate from the ground station antenna 230, and the component A includes a portion that depends on the separation between the ground station antenna 230 and the base station processing equipment 231.

With larger beam sizes and/or beams that are placed further from satellite nadir, the maximum differential delay within a beam can be larger than the examples above. With other types of satellites (e.g., MEO and LEO satellites), the faster movement of the satellite relative to the ground station antenna 230 and/or relative to the terminals 220 and/or 222 can cause a higher rate of change in minimum delays and differential delays. Given the larger differential delay and/or uncertainties in estimating the minimum delays, terrestrial acquisition mechanisms may not be directly applicable, and adaptations are needed for a 4G or 5G over satellite system. The disclosed GNSS-independent and GNSS-assisted methods, when applied to 4G or 5G over satellite, leverage the terrestrial acquisition signal (e.g., acquisition burst) formats discussed below in connection with FIG. 5A.

Figure 4:
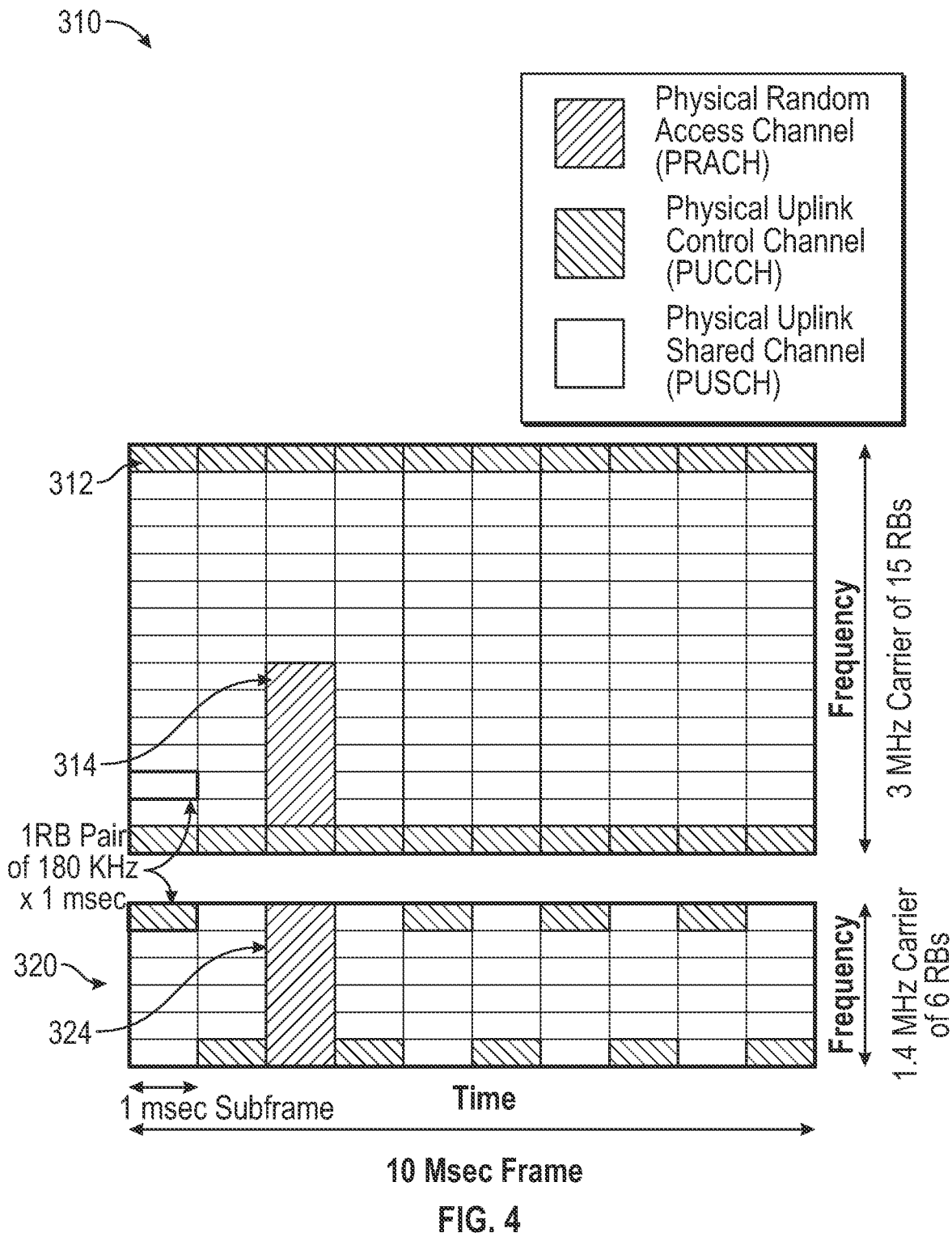
FIG. 4 is a diagram illustrating an example of an LTE uplink (UL) frequency-time resource grid, according to certain aspects of the disclosure.

FIG. 4 is a diagram illustrating an example of an LTE uplink (UL) frequency-time resource grid, according to certain aspects of the disclosure. The LTE radio resource grid (e.g., 310 and 320 of FIG. 4) is a time-frequency representation of the usage of a carrier to carry both control and user data information. In the time dimension there are repetitive 10 msec frames with each frame consisting of ten subframes 312 that are about 1 msec in duration. In the frequency dimension in the example of FIG. 4, a carrier consists of multiple resource blocks (RBs) of 180 kHz. The number of RBs in a carrier depends upon the bandwidth size of the carrier. For instance, there are 6 RB in the 1.4 MHz carrier (e.g., 1.08 MHz usable bandwidth plus guard band which is customarily not shown in a Grid), and 15 RBs in a 3 MHz carrier (e.g., 2.5 MHz usable bandwidth plus guard band).

FIG. 4 illustrates the example UL (e.g., user to eNB) direction resource grids for the 1.4 MHz and the 3 MHz carriers. In the uplink Grid, an acquisition block 314 (or 324) of 6 RB by n msec (e.g., n=1, 2, or 3) may be configured to be used for acquisition. The acquisition block 314 (or 324) is said to carry the physical random access channel (PRACH). In FIG. 4, the acquisition block 314 of resource grid 310 includes one PRACH with n=1 (e.g., corresponding to one subframe 312), in a 3 MHz carrier; and the acquisition block 324 of resource grid 320 includes one PRACH with n=1, in a 1.4 MHz carrier. FIG. 4 also illustrates other channels in the example UL direction resource grids, including Physical Uplink Control Channel (PUCCH) and Physical Uplink Shared Channel (PUSCH) blocks.

Figures 5A, 5B:
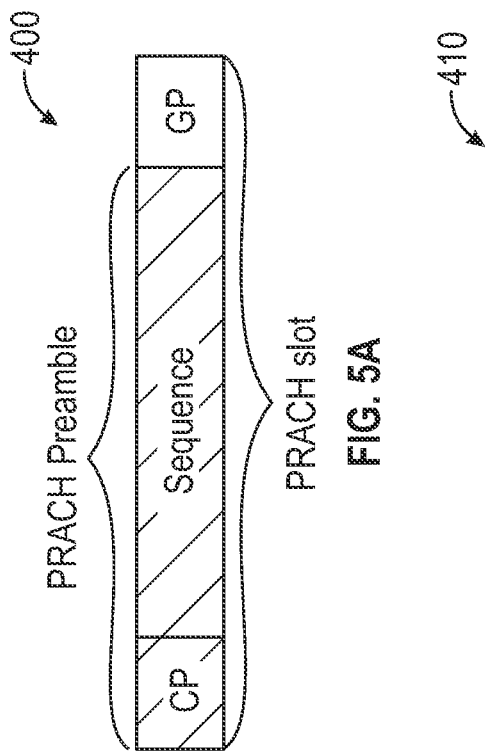
FIGS. 5A and 5B are diagrams illustrating an example of a terrestrial 5G NR acquisition signal, and a table illustrating example parameters for the signal, according to certain aspects of the disclosure.

FIGS. 5A and 5B are diagrams illustrating an example of an acquisition signal 400 for terrestrial 4G or 5G systems, and a table 410 of example parameters for NR acquisition signal. The acquisition signal 400 shown in FIG. 5A illustrates a PRACH preamble and its corresponding PRACH slot. A 4G or 5G PRACH preamble (also referred to as a PRACH burst) consists of a cyclic prefix (CP) and a Zadoff-Chu (Z-C) sequence. The CP is a copy of the tail end portion of the Z-C sequence of CP duration. The Z-C sequence has several properties facilitating its detection at a base station (e.g., base station 130, onboard partial base station 170, or onboard base station 180 of FIG. 1A, 1B, or 1C). A PRACH slot is the time duration in which a PRACH preamble is transmitted and no other transmission (within the same frequency bandwidth) is allowed. The duration is that of a PRACH preamble plus a guard period (GP).

There are different formats of PRACH preambles with different time lengths of CP, sequence, and GP. For NR, there are 13 formats, resulting in various possible values of CP, sequence, and GP time lengths. For NR, a few examples are shown the table 410 of FIG. 5B. In the example of FIG. 5B, μ is an NR configuration parameter on OFDM subcarrier spacing and frame structure, collectively called numerology.

Figure 6:
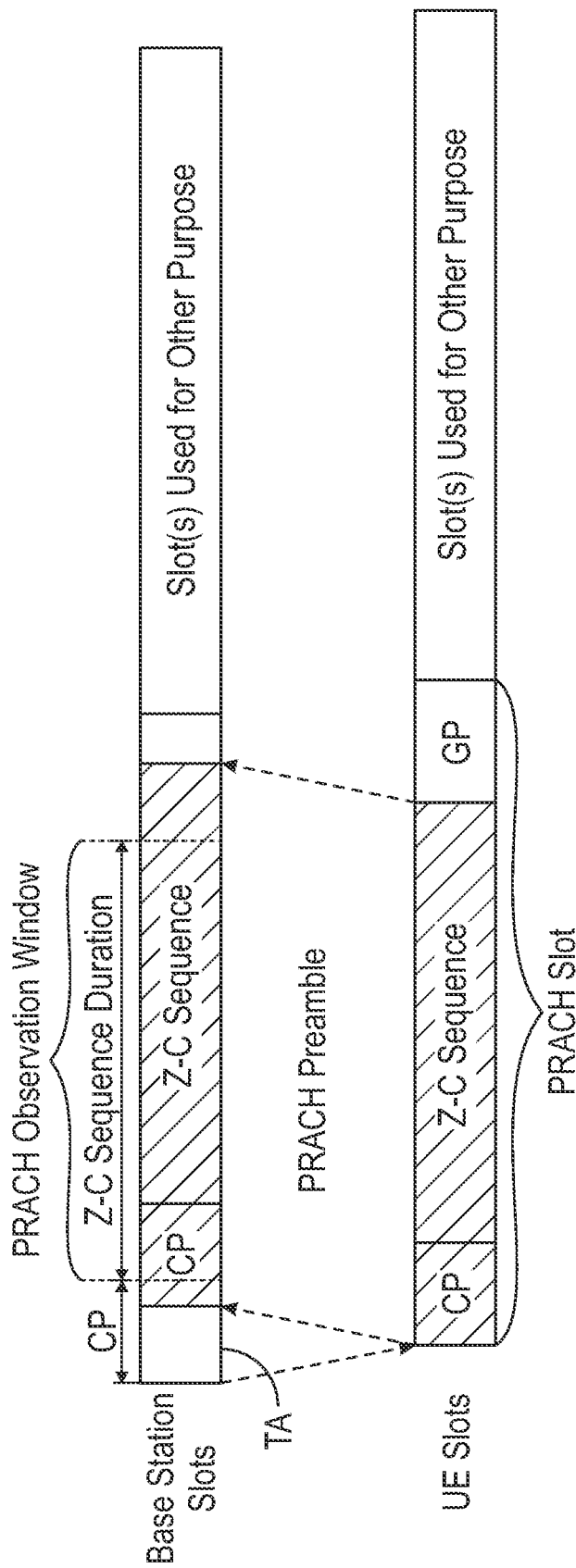
FIG. 6 is a diagram illustrating an example of a terrestrial 5G NR physical random access channel (PRACH) reception slot, according to certain aspects of the disclosure.

FIG. 6 is a diagram illustrating an example of a PRACH slot for a terrestrial 4G or 5G network. A terrestrial acquisition process, as illustrated in FIG. 6, may include a base station transmitting a downlink carrier that embeds (frame and subframe boundary) timing information and contains PRACH frequency and (frame and subframe) schedule information. A terminal (e.g., 120 of FIG. 1) monitors and locks (e.g., synchronizes) on to the received downlink carrier frames and subframes and retrieves the PRACH frequency and schedule information. Due to the distance between the terminal and the base station, the terminal (receive) frames and subframes are later in time than (e.g. in FIG. 6, to the right of) those at the base station by an offset equal to the delay between the terminal and the base station. The terminal transmits a PRACH burst (also referred to as a PRACH preamble) starting at the beginning of a scheduled PRACH slot referenced in the terminal receive frames and subframes. The base station receives the PRACH burst in the base station PRACH time slot and measures its arrival time against the base station PRACH slot start time. Due to the distance between the terminal and the base station, the PRACH burst arrives at the base station at a time that is twice the delay between the base station and the terminal (e.g., 2(A+C) in FIG. 6, such as for the example system shown in FIG. 2B), after the start time of the base station PRACH slot. The base station sends a message addressed to the specific terminal with the measured two-times delay between the terminal and the base station, which may be referred to as a timing advance (TA).

In one or more implementation, the terminal can next apply the TA in its subsequent transmissions to the base station, by shifting (e.g., advancing) the start of a burst by TA amount of time earlier than the scheduled transmit time, so that the burst arrives at the base station at the scheduled time according to base station timing. The base station continues to measure terminal burst arrival time variation from base station timing and to continuously feedback the measured timing variation to the terminal, allowing the terminal to maintain its precise timing in transmission to the base station.

An aspect of the terrestrial acquisition process design is that the base station only needs to detect a PRACH preamble in an observation window, as shown in FIG. 6. The observation window starts at CP duration after the start of a PRACH slot, and the observation window extends for a duration of the Z-C sequence. If the terminal-base station distance is within the maximum cell radius shown in Table 410, then the PRACH observation window will capture a full Z-C sequence, due to the cyclic nature of the CP, as shown in FIG. 6. Some base station implementations take advantage of this fact, to be able to run an efficient PRACH preamble detection and preamble arrival time estimation algorithm only within the observation window.

For acquisition in an 4G over satellite system or a 5G over satellite system, the acquisition mechanism has to accommodate a delay between the satellite base station, the satellite, and/or and a terminal located anywhere in a beam. The delay can be decomposed into two parts.

The delay can include a minimum delay that includes a component between the satellite base station and the satellite, and/or a component between the satellite and the point $P_{near}$ in the beam that is closest to the satellite (e.g., the minimum delay of the beam). The delay also includes the differential delay between the location of the terminal and location $P_{near}$. For a particular beam, its minimum delay is deterministic, being a function of base station processing equipment-to-base station antenna, base station antenna location, satellite position in space, beam radius, and beam center location on earth. However, the differential delay is non-deterministic prior to the terminal acquiring into the system, and is thus dependent upon the terminal location within the beam. Accuracy of estimated satellite position, that is, satellite ephemeris accuracy may affect the accuracy of per-beam minimum delay calculation. The acquisition processes disclosed herein can be performed to determine this the minimum delay and/or the differential delay. The geometry of $P_{near}$ and maximum value of differential delay is shown, for example, in FIGS. 3A and 3B. In contrast, in terrestrial networks illustrated in FIGS. 2A and 2B, the minimum delay is 0 or A, and is unchanging due to the fixed position of the ground-based TRPs and/or base station processing equipment.

In accordance with aspects of the subject disclosure, methods for providing random access for 4G over satellite and/or 5G over satellite systems include a first GNSS-independent method, a second GNSS-independent method, and a GNSS-assisted method that is independent of ephemeris information for the satellite. In accordance with aspects of the subject disclosure, the first GNSS-independent method, the second GNSS-independent method, and/or the GNSS-assisted method can be performed by LTE, LTE-M, NR, eMTC, and/or RedCap systems that include a base station (BS), a satellite, and/or one or more terminal devices (also referred to herein as UEs). The disclosed methods allow the satellite(s) in the systems performing the first GNSS-independent method, the second GNSS-independent method, and/or the GNSS-assisted method to be any of a GEO satellite, a MEO satellite, an HEO satellite, or a GEO satellite.

Figure 7:
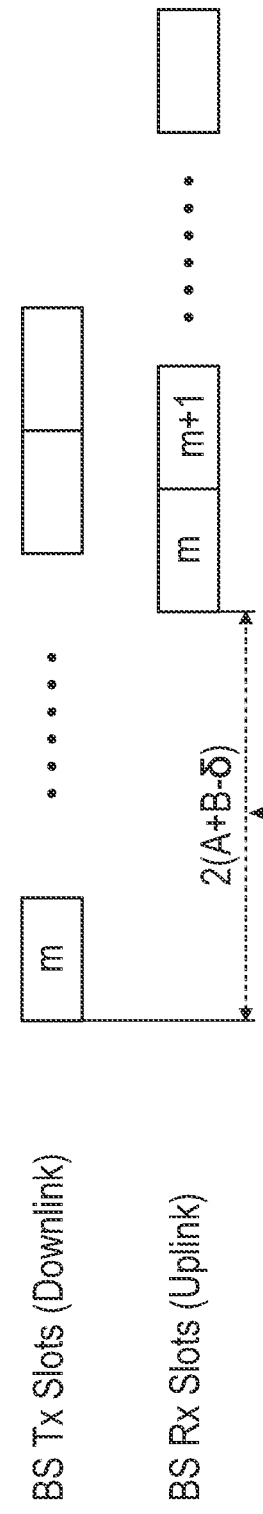
FIG. 7 is a diagram illustrating an example of base station receive slots delayed by a minimum time delay relative to corresponding base station transmit slots, according to certain aspects of the disclosure.

In accordance with aspects of the subject disclosure, in the first GNSS-independent method, BS processing equipment (e.g., ground base station 130, onboard partial base station 170, or onboard base station 180) adjusts its receive timing (as illustrated in FIG. 7) to accommodate the delay B (e.g., for processing payload satellites such as shown in FIGS. 1B and 1C) or the delay A+B (e.g., for transparent payload satellites such as shown in FIGS. 1A, 3A, and 3B). In this way, the BS can anticipate a PRACH preamble from a UE to arrive at least with that much delay. In the example of FIG. 7, the BS delays receive slots such as Rx uplink slots m, m+1, etc. relative to corresponding transmit slots, m, m+1, etc., by a minimum time delay 700. In the example of FIG. 7, the minimum time delay 700 is shown for a transparent payload satellite implementation and is twice the sum of delay components A+B (see, e.g., FIGS. 3A and 3B) minus a maximum error value delta ($\delta$).

The maximum error value, $\delta$, can account for an ephemeris accuracy for the satellite (e.g., an initial uncertainty in the position of the satellite and/or in characteristics of the satellite beam). The error value delta is determined (e.g., based on the ephemeris accuracy for the satellite) to cause, from a corresponding satellite beam, the acquisition signal to arrive at the base station no earlier than a beginning of an intended PRACH slot (e.g., slot m) at the base station. In the example of FIG. 7, BS Rx slots are shifted in time late by $2(A+B-\delta)$ for a beam, to anticipate UE uplink transmission of slot m from that beam to arrive at BS at least that much later than BS downlink transmission of slot m. The first GNSS-independent method does not incur user link spectrum overhead. However, the uplink frames at the BS are not aligned across beams and not aligned with downlink frames.

In one or more implementations, both delay components A and B are functions of the time-varying satellite position and beam location relative to satellite. With predicted satellite ephemeris and beam location, A+B may be calculated to within, for example, 10 μsec accuracy. The calculated value of 2(A+B) may have an accuracy within, for example, 20 μsec. As examples, the rate of change of A+B may be less than 47 μsec/sec for LEO and less than 0.3 μsec/sec for GEO. In, for example, a frame of 10 msec, 2(A+B) changes by less than 1.0 μsec. Accordingly, the total error in the calculated value of 2(A+B) may be within about 20 μsec. The offset ($-2\delta$) in 2(A+B$-\delta$) may ensure that, from the beam of interest, PRACH preambles intended to arrive in slot m at BS arrive no earlier than the beginning of slot m.

In the example of FIG. 7 and the first GNSS-independent method, the BS adjusts its receive slot and frame timing. However, as described herein, in other implementations (e.g., the second GNSS-independent method), instead of the BS adjusting its receive slot and frame timing, the BS broadcasts a quantity indicating (A+B) information to all UEs in a beam. Each UE adjusts its PRACH preamble transmission timing to account for, for example, 2(A+B). The quantity that the BS broadcasts may be designed to reduce the number of bits to broadcast thereby reducing the overhead on downlink bandwidth usage.

Figure 8:
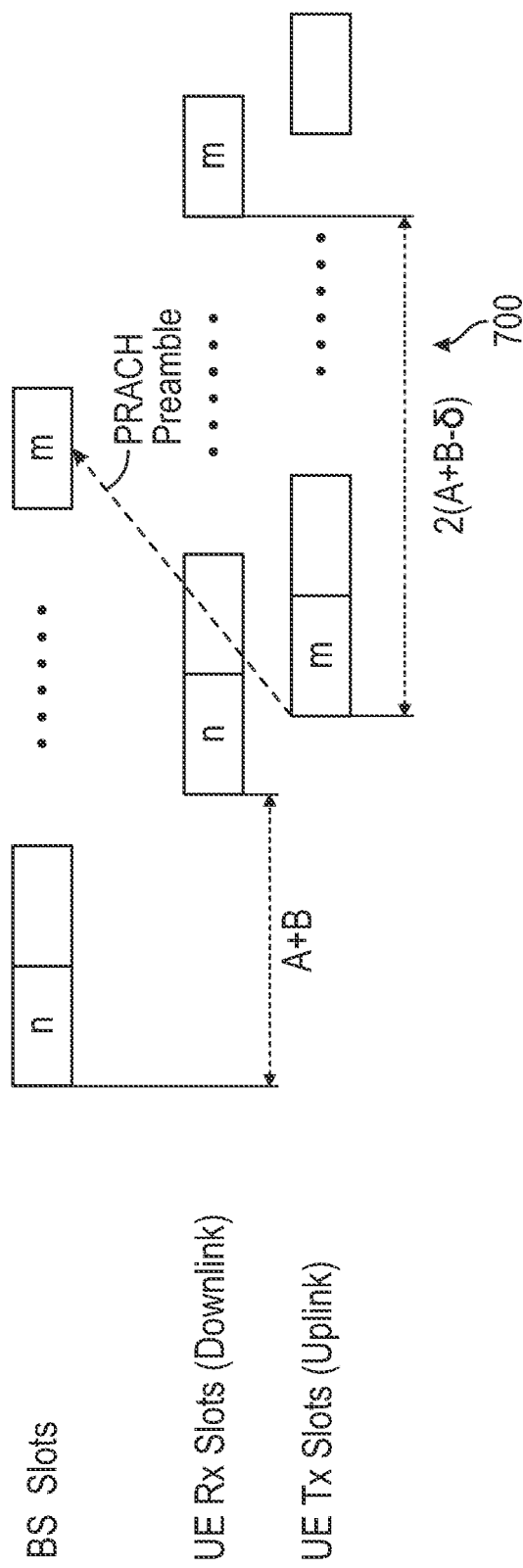
FIG. 8 is a diagram illustrating an example user equipment acquisition signal (PRACH) transmit slot advanced by a minimum time delay relative to corresponding user equipment receive slots and base station transmit slots, according to certain aspects of the disclosure.

In accordance with aspects of the subject disclosure, in the second GNSS-independent method, the BS can transmit one or more quantities associated with a minimum delay B or A+B to the UE. The UE can then advance its PRACH preamble (as shown in FIG. 8) to accommodate the delay B (e.g., for processing payload satellites such as shown in FIGS. 1B and 1C) or the delay A+B (e.g., for transparent payload satellites such as shown in FIGS. 1A, 3A, and 3B), to cause a PRACH preamble from the UE to arrive in the expected PRACH slot at the BS, and to account for an ephemeris accuracy for the satellite (e.g., an initial uncertainty in the position of the satellite and/or in characteristics of the satellite beam). In the example of FIG. 8, UE Tx slots are shifted in time early by 2(A+B$-\delta$) in a beam, such that UE uplink transmission of a PRACH preamble intended to arrive at the BS in slot m arrives at the BS close to, but not earlier than, the beginning of slot m at the earliest (e.g., when UE is at Pnear as illustrated in FIG. 3A or 3B). As illustrated in FIG. 8, the second GNSS-independent method incurs a small user link spectrum overhead (e.g., to transmit the minimum delay to the UE), but uplink frames at the BS are aligned across beams and also with downlink frames.

In accordance with aspects of the subject disclosure, in the second GNSS-independent method, a BS may broadcast, in a minimum delay system information block (SIB), a quantity such as a first quantity Quantity1=(A+B)$-\delta$ with a precision of $\delta$, and (e.g., if the satellite is a LEO satellite), also a second quantity Quantity2=(A+B)' with a precision of epsilon ($\epsilon$). Quantity2, (A+B)', is the rate of change of (A+B) in time. Quantity1 (and for LEO Quantity2) may be calculated for a $t_A$=broadcast time+(A+B). That is, Quantity1 and Quantity2 are in effect for the time instance that a UE at the closest-to-satellite location in the beam receives the information. In the case of a GEO satellite, Quantity2 is very small and can be regarded as zero or may not be included in the SIB.

In this example, $\delta$ may be the maximum error of the calculated value of (A+B) vs. the true value of (A+B); for example, $\delta$ may be 10 μsec. In this example, epsilon may be 0.37 microsecond per second for a LEO satellite at 500 km orbit. In one or more implementations, the BS may repeat the SIB broadcast (including the Quantity1 and/or Quantity2) at a rate of once every P seconds, where P may be, for example, 1.28 seconds.

In the second GNSS-independent method illustrated in FIG. 8, a UE may store the latest received SIB including Quantity1 (and Quantity2 for LEO) and a time of reception $t_R$ of the latest received SIB. When transmitting a PRACH preamble at $t_T$ to arrive at the BS in a slot m, the UE may, for example, calculate the quantity $2(A+B-\delta)$ as, for example, $2(Quantity1+(t_T-t_R)*Quantity2)$ and then the UE may advance the transmission time (e.g., earlier) by $2(A+B-\delta)$, as shown in FIG. 8.

The disclosed procedures for the first and second GNSS-independent methods, allow the timing advance for PRACH transmission time to be accurate within, for example, $2\delta=20$ μs. The offset ($-2\delta$) in $2(A+B-\delta)$ may ensure that, from the beam of interest, PRACH preambles intended to arrive in slot m at BS arrive no earlier than the beginning of slot m, accounting for inaccuracy in $2(A+B)$ due to satellite ephemeris inaccuracy. In selecting a slot m in the second GNSS-independent method illustrated in FIG. 8, a UE ensures that m is at least $2(A+B)$ in the future relative to slot n corresponding to the UE current time. A slot m requiring UE transmission before the UE current time may be determined to be invalid.

In the second GNSS-independent method illustrated in FIG. 8, in which information associated with a minimum delay is provided from the BS to UEs, for systems that include GEO satellites, the quantity (A+B) may have a maximum value of, for example, 270 msec which takes 15 bits to represent at 10 μsec resolution. Since (A+B)' is less than 0.3 μsec/sec for GEO, each broadcasted Quantity1 (e.g., $(A+B-\delta)$), if updated every, for example, 1.28 seconds, has an accuracy of better than 1 μsec. In this example, a total of 15 bits are sufficient for (A+B) information in the minimum delay SIB.

In the second GNSS-independent method illustrated in FIG. 8, in which information associated with a minimum delay is provided from the BS to UEs, for systems that include LEO satellites, the quantity (A+B) may have a maximum value of 12 msec which takes 11 bits to represent at 10 μsec resolution. Since the acceleration of (A+B) in this example may have a maximum value of 0.74 μsec/sec², with Quantity2 (e.g., (A+B)') represented at 0.37 μsec/sec resolution, taking 7 bits, linear interpolation of the instantaneous value of A+B for a time instance 1.28 seconds in the future, as shown in the UE procedure, introduces an error of less than 1 μsec, if Quantity2 is calculated properly at the BS. In this example, a total of 11+7=18 bits are sufficient for (A+B) and (A+B)' info in the minimum delay SIB.

In one or more implementations of the first and/or second GNSS-independent methods, the number of bits to broadcast may be reduced if Quantity1 is defined as, for example, $(A+B)-(A+B)_{min}-\delta$, where $(A+B)_{min}$ is the minimum value of A+B for a system. For example, $(A+B)_{min}$ may be 240 msec for a GEO system and 3.3 msec for a LEO system. At the UE, the fixed quantity $(A+B)_{min}$ may be added back in the timing advance calculation. In this example, $(A+B)-(A+B)_{min}$ delta may have a range of about 0 to 30 msec for GEO, needing 12 bits, or a range of about 0 to 8.7 msec for LEO, needing 10 bits. Thus, in this example, a total of 12 bits are sufficient for GEO and 17 bits sufficient for LEO, in the minimum delay SIB. Note that due to the smaller dynamic range of $(B-\delta)$, with the same magnitude of $\delta$, potentially 1 fewer bit is needed to broadcast when the base station is at the satellite.

The systems and methods described above for the GNSS-independent methods can also apply to GNSS-independent random access for LEO at other altitudes and/or MEO, and/or GEO at different inclinations. For example, for a LEO satellite at higher than 500 km altitude and for a MEO satellite, using, for example, $\delta=10$ μsec, the BS Rx slot timing update rate (e.g., in the first GNSS-independent method) can still be at once every 10 msec, and/or the BS broadcast SIB update rate (e.g., in the second GNSS-independent method) can still be at once every 1.28 seconds, with less than or equal to about 18 bits of information. In this example, a 1.28 sec update rate of the minimum delay SIB balances the overhead and the time a UE waits to receive the SIB for synchronizing with the system.

In both the first GNSS-independent method and the second GNSS-independent method, the BS processing equipment can then process the PRACH preamble received from a UE, either with delayed receive timing at BS or time advanced by the UE, using operations similar to those in a terrestrial 4G or 5G networks, with modifications as described herein below.

Using the acquisition signal (e.g., the PRACH preamble) received at the BS with the per-beam minimum delay (e.g., $A+B-\delta$ or $B-\delta$) already accounted, the differential delay for the UE (terminal device) can be determined.

For example, in both the first GNSS-independent method and the second GNSS-independent method, the BS processing equipment (e.g., ground base station 130, or onboard portion 170, or onboard base station 180) iteratively executes a 4G or 5G PRACH preamble detection and estimation process, to determine the differential delay C, which may be much larger than the differential delays experienced in a terrestrial network.

Referring back to FIGS. 2B, 5B, and 6, one of the NR PRACH preamble formats can accommodate a max cell size of about 102 km, meaning the format can handle a differential delay C in the range of [0, 0.342] msec. The preamble format can actually resolve a round-trip (2×) differential delay in the range of [0, 0.684] msec. The other preamble formats, some for wider bandwidth and higher data rate carriers, accommodate much smaller cells and much shorter differential delay range. Referring back to, for example, FIGS. 3A and 3B, for a satellite beam, the differential delay C can be much longer than 0.342 msec. For example, for a GEO satellite with 0° inclination and a typical 1° diameter beam centered at same satellite longitude but at 45° latitude, C has a range of [0, 2.64 msec] (i.e. round-trip differential delay in range of [0, 5.28] msec). For a LEO satellite at 500 km altitude and a typical 6° diameter beam with far-edge (i.e. point Pnear) having an elevation of 20°, C has a range of [0, 0.833] msec (i.e. round-trip differential delay in range of [0, 1.666] msec).

Figure 9:
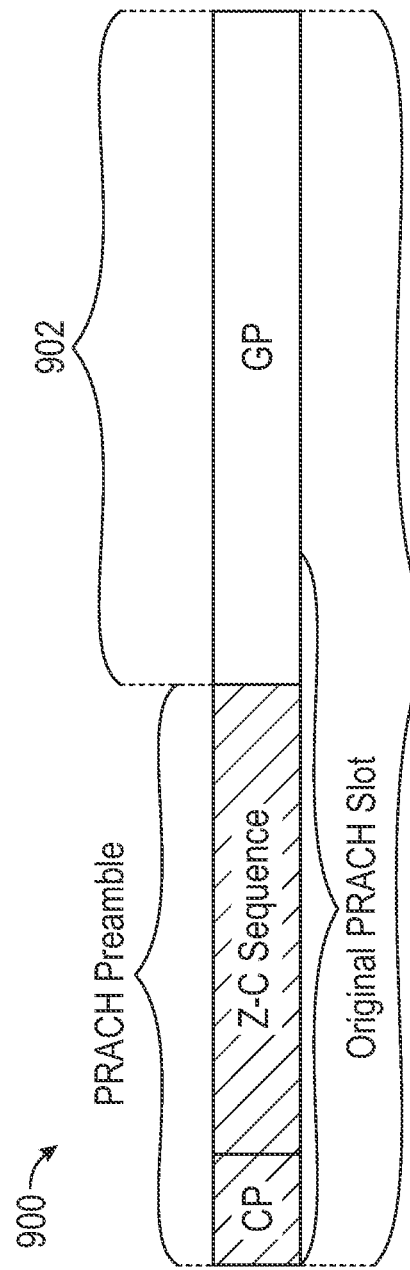
FIG. 9 is a diagram illustrating an example of an acquisition signal with a guard period extended based on satellite beam size, beam location, and a maximum error value, according to certain aspects of the disclosure.

In accordance with aspects of the disclosure, in the first and/or second GNSS-independent methods disclosed herein (e.g., to overcome the wider differential delay range of a satellite beam), the acquisition signal that is transmitted by a UE to the BS can preserve the preamble formats as used for 4G or 5G networks, but the PRACH slot extends the guard period (GP). For example, the GP may be extended to be at least 2× the maximum differential delay of the beam, plus $2\delta$ (e.g., the GP may be extended to a length $2(\max(C)+\delta)$, and still make the entire PRACH slot duration to be an integer multiple of the underlying 4G subframe or 5G slot duration. An example of an acquisition signal having a PRACH preamble 900 and a PRACH slot with a guard period (GP) 902 that is extended (e.g., relative to the GP in an original PRACH slot) based on the maximum possible differential delay (e.g., max(C)) and an error value (e.g., δ) associated with the satellite ephemeris, is shown in FIG. 9.

For each 4G LTE and LTE-M or 5G NR, RedCap, and eMTC PRACH format (see, e.g., table 410) with the corresponding preamble, multiple for-satellite formats are possible with different values of GP, to accommodate satellite beams of different C value ranges. For example, for the GEO beam example described above, with C in the range of [0, 2.64] msec, and for an NR PRACH Format 1 (see table 410), a new PRACH format may have a PRACH slot duration of 8 msec (8 underlying slots) with a GP of 8−(0.684+1.6) =5.716 msec>2*(2.64+0.01)=5.30 msec. As another example, for the LEO example described above and for the same NR PRACH Format 1, a new PRACH format may have a PRACH slot duration of 4 msec with a GP of 4−(0.684+1.6)=1.716 msec>2*(0.833+0.01)=1.686 msec. For a UE at an arbitrary location within a beam, even if the UE transmits its PRACH preamble at the beginning of the UE extended PRACH slot, the preamble may arrive anywhere in the BS extended PRACH slot, whether the BS delays its Rx slots (e.g., as in the first GNSS-independent method) or UE advances its Tx slots (e.g., as in the second GNSS-independent method).

Figure 10:
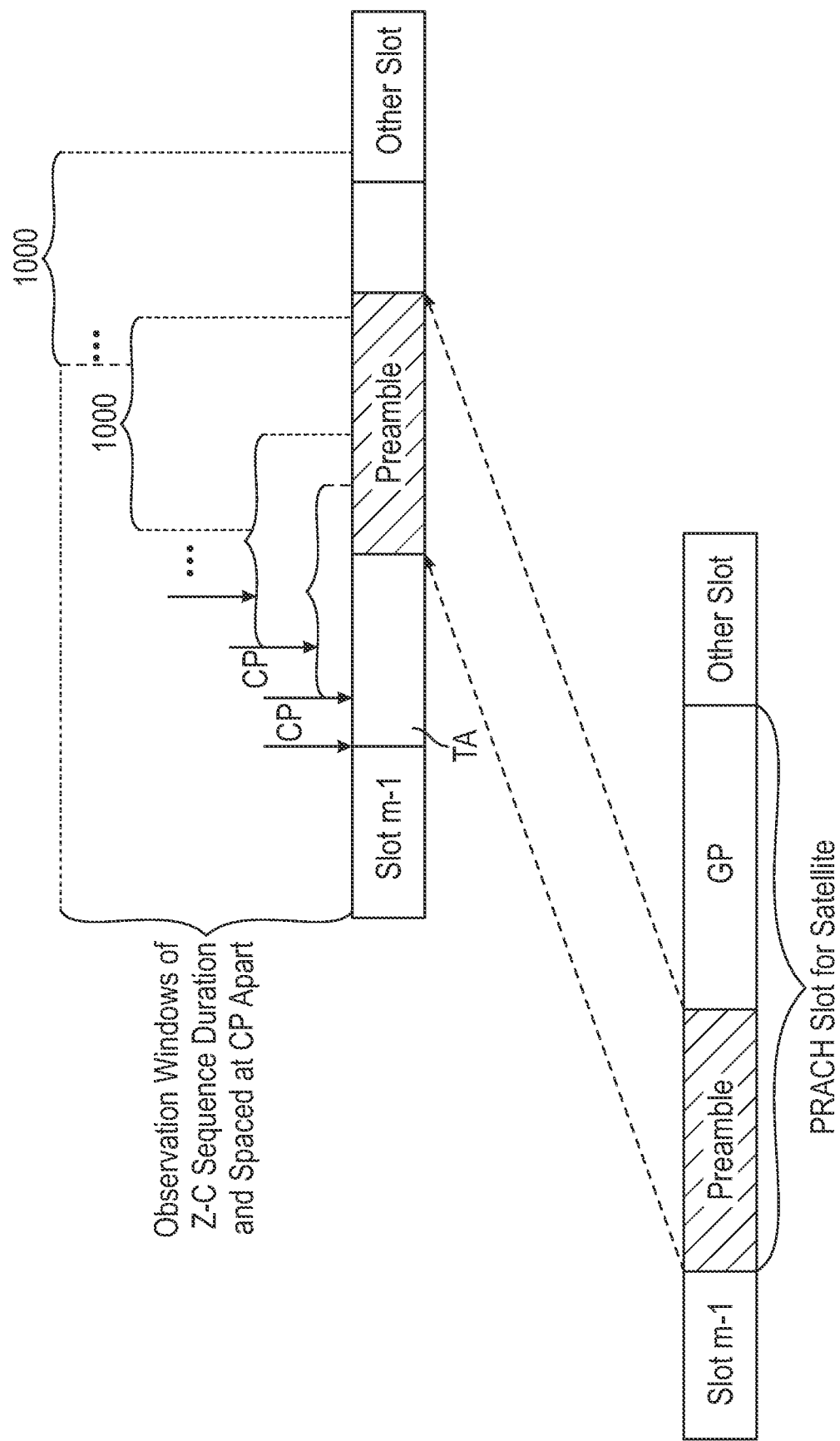
FIG. 10 is a diagram illustrating iterative observation windows for receiving and processing an acquisition signal from user equipment at a base station, according to certain aspects of the disclosure.

In order to determine the differential delay, at the BS, within the extended PRACH slot, a number $$\left\lceil \frac{GP \text{ duration}}{CP \text{ duration}} \right\rceil$$

successive and partially overlapping observation windows 1000 of Z-C sequence duration can be defined and spaced apart by the duration of the cyclic prefix (CP), as shown in FIG. 10. As illustrated in FIG. 10, in one or more implementations, the last observation window may not have full duration of the Z-C sequence.

As illustrated in FIG. 10, with a total duration of CP+Z-C sequence, a PRACH preamble will fully fill one and only one of the observation windows. At the BS, the same PRACH preamble detection and estimation algorithm that is used in a terrestrial BS can be performed, but iteratively in each of the observation windows 1000 (e.g., sequentially or in parallel depending on implementation). In an example, a $K^{th}$ $$\left( \text{where } K = 1, 2, \ldots, \left\lceil \frac{GP \text{ duration}}{CP \text{ duration}} \right\rceil \right)$$

observation window 1000 yields a detection, and an estimate η, (0≤η<CP) of the round-trip (2×) differential delay. In this example, the BS may determine the overall estimated 2× differential delay plus δ (e.g., 2(C+δ)), as (K−1)*CP+η. The BS may set the determined 2× differential delay plus delta as a timing advance (TA). This determined TA may be transmitted to the UE (e.g., in random access response (RAR)). In this way, a differential delay determined by the BS and transmitted to the UE may be based in part on a determination of which of a plurality of successive and partially overlapping observation windows (e.g., the Kth observation window) receives the acquisition signal (e.g., which of the observation windows is fully occupied by the PRACH preamble) from the UE (e.g., and also based in part on an estimated 2× differential delay estimated from the determined observation window, that is less than the duration of the cyclic prefix of the acquisition signal).

At the UE, after receiving, from the BS, the estimated TA, the UE may advance subsequent transmissions to the BS by the quantity TA, in addition to any PRACH preamble transmission timing advance. Thus, in the second GNSS-independent methods described herein, in which it is the UE that advances the transmission of the PRACH preamble by the minimum delay (e.g., 2(A+B−δ) for transparent payloads or 2(B−δ) for processing payloads), the UE advances subsequent transmissions by the sum of the minimum delay and the received TA. In this way, the received TA incorporates the error value, δ, in a way that cancels the effect of including the error value in the minimum delay.

It should be appreciated that, although the examples of the GNSS-independent methods are described herein for use in satellite networks, aspects of the GNSS-independent methods can also apply advantageously to terrestrial networks. For example, several of the NR PRACH preamble formats have a GP longer than the CP. Rather than using one observation window at the BS, resulting in a max cell size of min(CP, GP)*speed of light/2, in one or more implementations of terrestrial networks, multiple CP spaced observation windows may be used at the BS and the PRACH preamble detection and estimation algorithm iteratively run in all the windows. This extension allows the max cell size to be max(CP, GP)*speed of light/2. For example, with 21 observation windows, Format A3 with μ=3 may support a cell size of 10.6 km, rather than 0.5 km. For example, in one or more implementations, a base station in a terrestrial network may perform, iteratively at the base station in each of several successive and partially overlapping observation windows that are separated by a length corresponding to a cyclic prefix of a PRACH preamble, a PRACH preamble detection operation. The base station may process a PRACH preamble from the terminal device, the PRACH preamble partially filling one or more of the observation windows and entirely filling one of the observation windows. The base station may determine a differential delay corresponding to the terminal device based on the one of the observation windows that is entirely filled with the PRACH preamble (e.g., based on a timing of the one of the observation windows that is entirely filled with the PRACH preamble. Subsequent communications between the base station and the terminal device, in part, using the determined differential delay (e.g., and using a minimum delay that would occur for a UE that is located at the base station TRP).

In accordance with aspects of the disclosure, a GNSS-assisted method is also disclosed herein, for random access in 4G or 5G satellite networks. For example, in the GNSS-assisted method(s), a UE estimates the total delay A+B+C (e.g., in a transparent payload system) or B+C (e.g., in a processing payload systems), with assistance from the BS, but without using, for example, ephemeris information transmitted from the BS or the satellite. The UE may then adjust its PRACH preamble transmission time by 2× the estimated total delay, and the BS or BS DU then determines the residual timing error from the PRACH preamble for subsequent communications.

For UEs that include a GNSS receiver, the GNSS receiver can act as an accurate clock with accuracy better than, for example, 1 μsec. A UE may estimate the delay (A+B+C) or (B+C) by measuring the arrival time $t_R$ of a particular downlink transmission from a BS. For example, the downlink transmission may be, for example, the physical broadcast channel with master information block (PBCH/MIB). And the UE can determine information about the transmit time $t_T$ of that specific PBCH/MIB.

In 4G LTE or LTE-M and 5G NR, RedCap, or eMTC, time is partitioned into 10 msec frames, with each frame numbered with a system frame number (SFN). The SFN has 10 bits and can represent a total of 1024 frames or a time period of 10.24 seconds. The SFN repeats every 10.24 seconds. Embedded in the MIB is the upper 6 bits of the SFN for NR and RedCap or the upper 8 bits of the SFN for LTE, LTE-M, and eMTC, of the frame in which the MIB is transmitted from the BS. Encoding of the MIB conveys the lower 4 or 2 bits of SFN. Thus, a UE can derive the whole SFN of the frame in which a particular MIB is received.

In accordance with aspects of the disclosure, in the GNSS-assisted methods disclosed herein, the BS (e.g., ground base station 130, onboard partial base station 170, or onboard base station 180) may align, by convention, the start of an SFN cycle (i.e. SFN=0) to a static epoch in GNSS time (for example, GPS time 2020 Jan. 1 00:00:00). The static epoch may be pre-stored at the UEs, and/or may be broadcast to UEs.

At the BS, in one example, once the start of the SFN cycle is aligned to the static epoch of GPS time 2020 Jan. 1 00:00:00, at an arbitrary GPS time such as 2020 Jan. 1 12:00:15, which is 12 hours 15 seconds after the epoch, the SFN would be (12×3600+15)×100 modulo 1024=220. In the GNSS-assisted method(s), other than this SFN alignment, the BS may configure PRACH slots and process PRACH preambles (detection and estimation) the same as in a terrestrial network.

At the UE, in the GNSS-assisted method(s), within a period of time (e.g., 10 msec) before transmitting a PRACH burst, the UE may measure the arrival GPS time $t_R$ of a downlink PBCH frame and derive its SFN=K. From this SFN, K, and using the arrival GPS time $t_R$, the UE derives the GPS time $t_T$ of the frame transmission from BS. Note that a particular SFN value of K corresponds to infinitely many GPS time instances spaced at 10.24 seconds. But with $t_R$ and the fact that (A+B+C) or (B+C) is less than 0.3 seconds, the correct value of $t_T$ can be uniquely resolved. For example, a MIB may be received at a UE at an approximate GPS time $t_R$=2020 Jan. 1 23:00:15.63697, with an SFN of 450. Since $t_R$ is within 0.3 seconds (<10.24/2=5.12 seconds) of the GPS time $t_T$ when the MIB is transmitted, the two GPS time instances associated with SFN=450 that are closest to $t_R$ are 2020 Jan. 1 23:00:15.380 and 2020 Jan. 1 23:00:25.620. Thus the unique GPS time $t_T$ may be determined by the UE to be 2020 Jan. 1 23:00:15.380.

The UE may then estimate the total delay (A+B+C) or (B+C) as the arrival time minus the transmission time, ($t_R$-$t_T$). The UE may then advance the transmission time (e.g., early) of subsequent communications (e.g., a PRACH preamble) by a TA=2*($t_R$-$t_T$-δ)≈2(A+B+C-δ), similar to the advance illustrated in FIG. 8, except for the different timing advance quantity, and including that δ may be, for example, 3 μsec.

In one or more implementations, the rate of change of (A+B+C) may be less than 47 μsec/sec for LEO at 500 km altitude and less than 0.3 μsec/sec for GEO. Within 10 msec between estimating ($t_R$-$t_T$) and transmitting a PRACH, the error in ($t_R$-$t_T$) due to satellite motion may thus be within 0.5 μsec. Accounting also for GNSS receiver timing error (e.g., <1 μsec) and the potential change in value (e.g., <~1 μsec) of A+B+C or B+C during PRACH propagation time from UE to BS, the total error in ($t_R$-$t_T$), as an approximation to (A+B+C) or (B+C), may be less than 2.5 μsec. The 2δ term with δ=3 μsec thus places the PRACH preamble arrival time at the BS to be no earlier than the start of PRACH receive slot at the base station.

Figure 11:
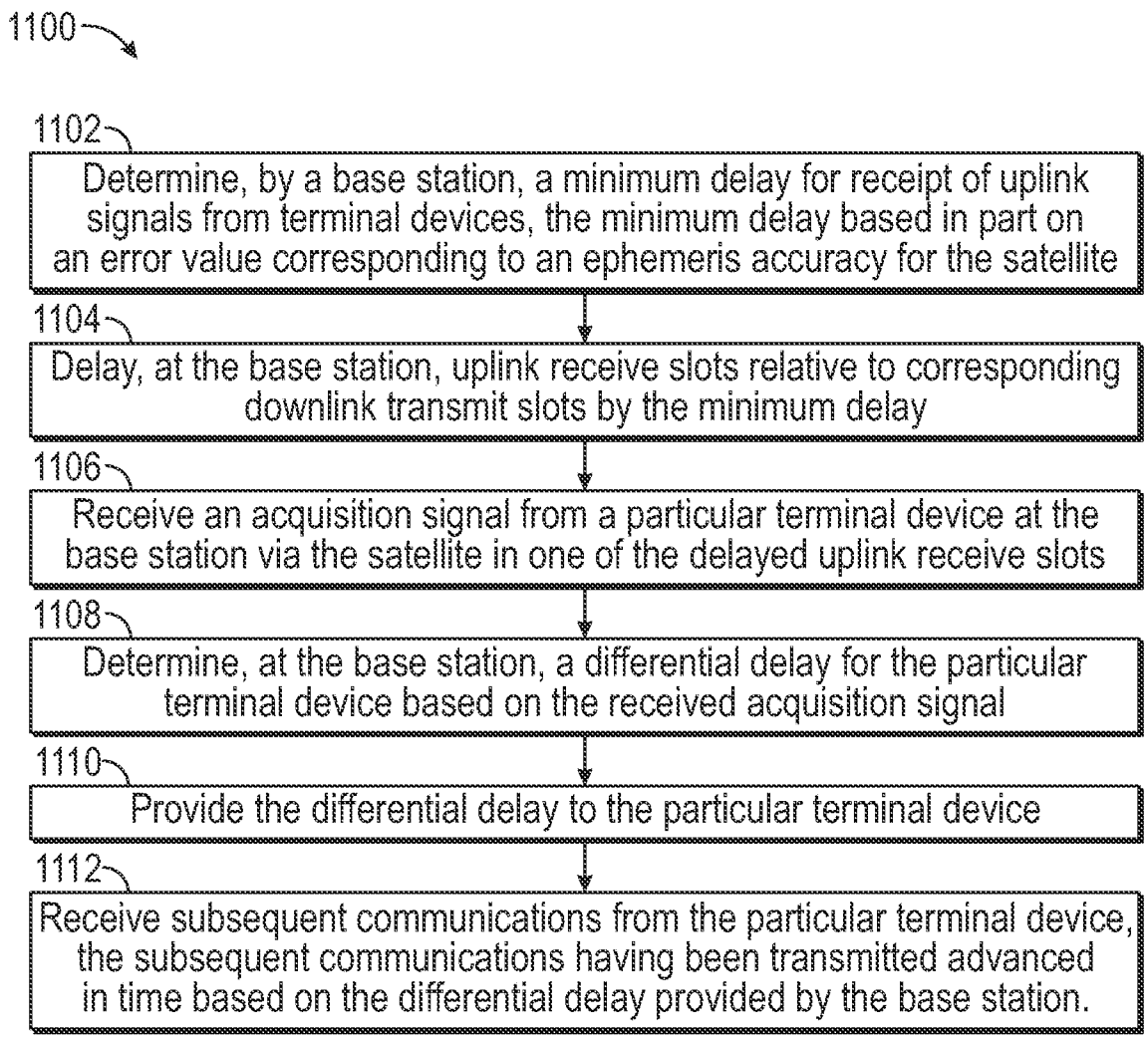
FIG. 11 is a flow diagram illustrating example GNSS-independent operations that may be performed by a base in a satellite 4G or 5G network, according to certain aspects of the disclosure.

FIG. 11 is a flow diagram illustrating an example method 1100 (e.g., a first GNSS-independent method) that includes operations that may be performed for communication in a 4G or 5G network, according to certain aspects of the disclosure. For example, the method 1100 may be a method for communication in a broadband satellite network that includes a base station and a satellite. In various implementations, the satellite (e.g., satellite 110 or 210 described herein) may be a Geostationary Earth Orbit satellite, a Medium Earth Orbit satellite, a Highly Elliptical Orbit (HEO) satellite, or a Low Earth Orbit (LEO) satellite. In various implementations, the broadband satellite network may be a LTE, LTE-M, NR, eMTC, or RedCap network.

In the example of FIG. 11, at block 1102, a base station (e.g., ground base station 130, onboard partial base station 170, or onboard base station 180) may determine a minimum delay (e.g., 2(A+B−δ) for transparent payload (bent pipe) systems, or 2(B−δ) for a processing payload system) for receipt of uplink signals from terminal devices. The minimum delay may be based, in part, on an error value (e.g., δ) corresponding to an ephemeris accuracy for the satellite (e.g., satellite 110 or 210 described herein). The error value may be determined to cause, for a corresponding satellite beam, the acquisition signal to arrive at the base station no earlier than a beginning of an intended PRACH slot at the base station.

In one or more implementations, the satellite may include at least a portion of the base station (e.g., as shown in FIG. 1B), and the minimum delay may be based on a position of the satellite, beam characteristics of the satellite (e.g., the beam geometry with respect to the satellite), a position of an additional portion of the base station (e.g., base station CU 172), and/or the error value. In one or more implementations, the base station may be a ground-based base station in communication with the satellite (e.g., as shown in FIG. 1A), and the minimum delay may be based on a position of the satellite, beam characteristics of the satellite (e.g., the beam geometry with respect to the satellite), a position of the base station, and/or the error value. In one or more implementations, the satellite may include the entire base station (e.g., as shown in FIG. 1C), and the minimum delay may be based on a position of the satellite, beam characteristics of the satellite (e.g., the beam geometry with respect to the satellite), and/or the error value.

At block 1104, at the base station, uplink receive slots may be delayed relative to corresponding downlink transmit slots by the minimum delay (e.g., as described above in connection with FIG. 7).

At block 1106, the base station may receive an acquisition signal (from a particular terminal device, also referred to herein as a UE) via the satellite in one of the delayed uplink receive slots. The acquisition signal may include a physical random access channel (PRACH) preamble. As discussed above in connection with, for example, FIG. 9, a receive slot may be a PRACH slot that may also include a guard period 902, the guard period 902 being extended based on a maximum differential delay (e.g., max(C)) and the error value (e.g., δ), such as by extending the guard period 902 by 2(max(C)+δ) as described in connection with FIG. 9.

At block 1108, the base station may determine a differential delay (e.g., 2(C+δ)) for the particular terminal device based on the received acquisition signal. In one or more implementations, the differential delay includes a portion (e.g., +2δ) that cancels an effect (e.g., −2δ) of the error value on the minimum delay (e.g., when the minimum delay is determined as 2(A+B−δ) or 2(B−δ) for transparent or processing payloads respectively). As described above in connection with, for example, FIG. 10, determining the differential delay may include determining which of several observation windows (e.g., observation windows 1000), which are separated by a length corresponding to a cyclic prefix (CP) of the acquisition signal, receives the acquisition signal. For example, determining which of the several successive and partially overlapping observation windows receives the acquisition signal comprises determining which of the several overlapping observation windows is fully occupied by a PRACH preamble. In one or more implementations, determining the differential delay may also include estimating a value η related to the differential delay, that can be resolved using the determined observation window, where η is between zero and the length of the CP (0≤η<CP). For example, the differential delay (e.g., 2(C+δ)) may be determined by computing, when the PRACH preamble is detected in a Kth observation window, a value of (K−1) *CP+η.

At block 1110, the differential delay (e.g., 2(C+δ)) may be provided to the particular terminal device.

At block 1112, subsequent communications from the particular terminal device may be received at the base station, the subsequent communications having been transmitted advanced in time based on the differential delay provided by the base station.

Figure 12:
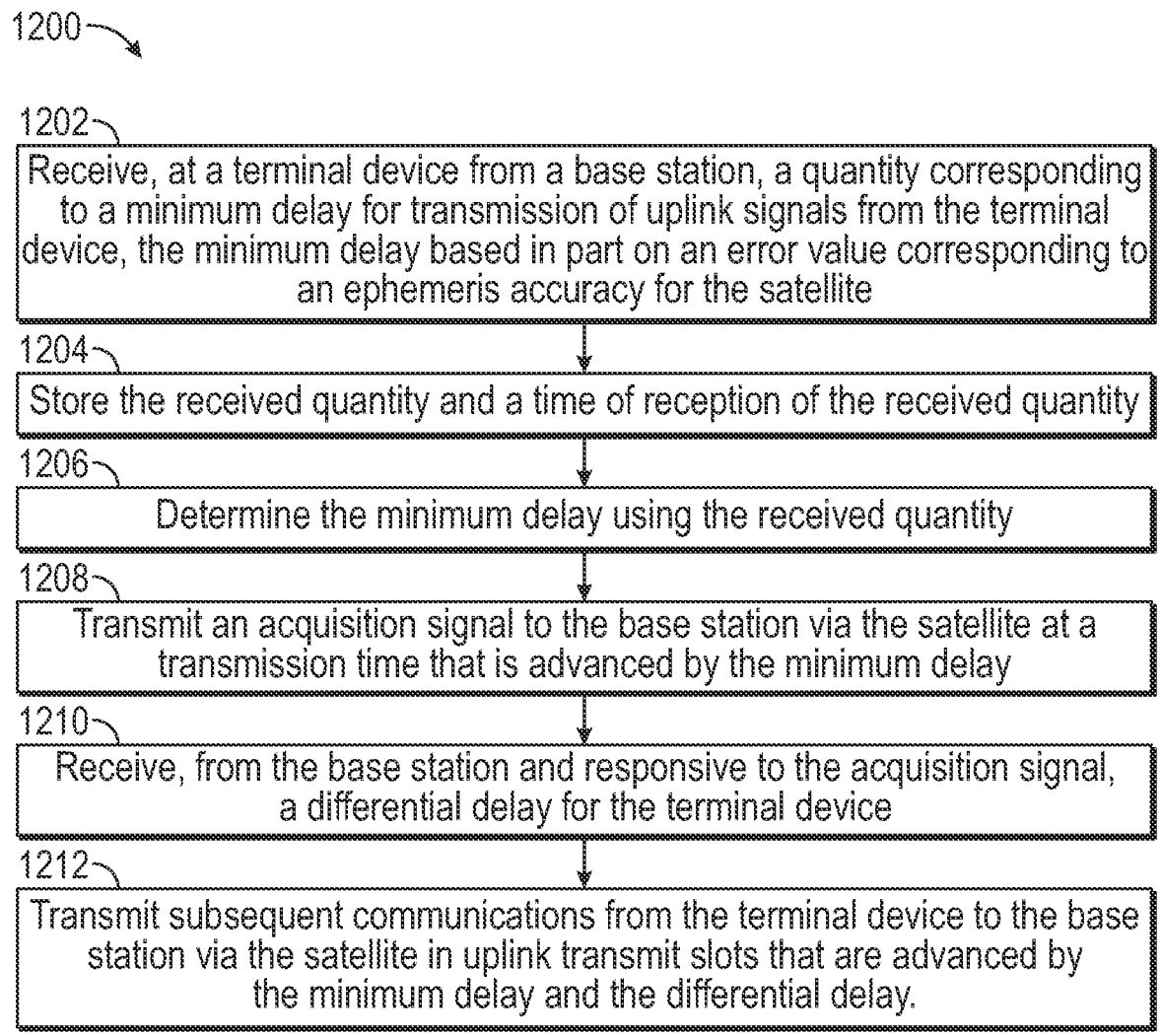
FIG. 12 is a flow diagram illustrating other example GNSS-independent operations that may be performed by a terminal device in a satellite 4G or 5G network, according to certain aspects of the disclosure.

FIG. 12 is a flow diagram illustrating an example method 1200 (e.g., a second GNSS-independent method) that includes operations that may be performed for communication in a 4G or 5G network, according to certain aspects of the disclosure. For example, the method 1200 may be a method for communication in a broadband satellite network that includes a base station, a terminal device, and a satellite. In various implementations, the satellite (e.g., satellite 110 or 210 described herein) may be a GEO satellite, a MEO satellite, a HEO satellite, or a LEO satellite. In various implementations, the broadband satellite network may be a LTE, LTE-M, NR, eMTC, or RedCap network.

In the example of FIG. 12, the terminal device (also referred to herein as a UE) receives from the base station, a quantity (e.g., Quantity1, such as B, A+B, B−δ, or A+B−δ) corresponding to a minimum delay (e.g., used to form a round trip minimum delay 2(A+B−δ) or 2(B−δ)) for transmission of uplink signals from the terminal device, the minimum delay time based in part on an error value (e.g., δ) corresponding to an ephemeris accuracy for the satellite. In one or more implementations, the acquisition signal may be a physical random access channel (PRACH) preamble to transmitted a PRACH slot that may include a guard period. The guard period may be extended based on a round-trip maximum differential delay (e.g., max(2C)) and an error value (e.g., δ), as described above in connection with, for example, FIG. 9.

At block 1204, the received quantity (e.g., and a time of reception, $t_R$ of the received quantity) may be stored at the terminal device. In one or more implementations, the quantity may be a reduced bit quantity that is based on a subtraction (e.g., (A+B)−(A+B)$_{min}$−δ) at the base station prior to transmission of the quantity, and determining the minimum delay time may include adding a value (e.g., (A+B)$_{min}$) to the reduced bit quantity.

At block 1206, the minimum delay may be determined using the received quantity (e.g., for the time of transmission of acquisition preamble). Determining the minimum delay may include, for example, doubling the received quantity. In one or more implementations, the error value is subtracted from an estimated delay (e.g., B or A+B) corresponding to a position of the satellite. In one or more implementations, BS may transmit the quantity as (A+B) or B, in which case the terminal subtracts the error value, corresponding to a position of the satellite, from the received quantity (e.g., B or A+B), before performing the doubling operation.

At block 1208, an acquisition signal (e.g., including a PRACH preamble, such as described in connection with FIG. 9) may be transmitted to the base station via the satellite at a transmission time that is advanced by the minimum delay (e.g., as described above in connection with, for example, FIG. 8).

In one or more implementations, the satellite may be an NGSO satellite, such as a Low Earth Orbit (LEO) satellite, and block 1202 may also include receiving an additional quantity (e.g., Quantity2) at the terminal device from the base station, the additional quantity corresponding to a rate of change of the quantity (e.g., (A+B)' or B'), such as due to motion of the NGSO satellite. In these implementations, determining the minimum delay using the quantity may include determining the minimum delay using the quantity, the additional quantity, the stored time of reception of the quantity and the additional quantity, and a transmit time for the acquisition signal (e.g., by computing 2(A+B−δ)=2 (Quantity1+($t_T$−$t_R$)*Quantity2)). In one or more implementations, the base station is configured to repeatedly update and broadcast the quantity and/or the additional quantity. For example, the base station may repeatedly update and broadcast the quantity and/or the additional quantity with a periodicity that is short enough to ensure that instances of quantity and additional quantity do not lose accuracy (e.g., with a periodicity of less than or equal to 1.28 seconds).

The acquisition signal may then be processed at a base station, for example, as described above in connection with blocks 1106 through 1112 of FIG. 11.

At block 1210, the terminal device may receive, from the base station and responsive to the acquisition signal, a differential delay (e.g., 2C, or 2(C+δ)) for the terminal device.

At block 1212, the terminal device may transmit subsequent communications from the terminal device to the base station via the satellite in uplink transmit slots that are advanced by the minimum delay and the differential delay (e.g., a sum of the minimum delay and the differential delay).

Figure 13:
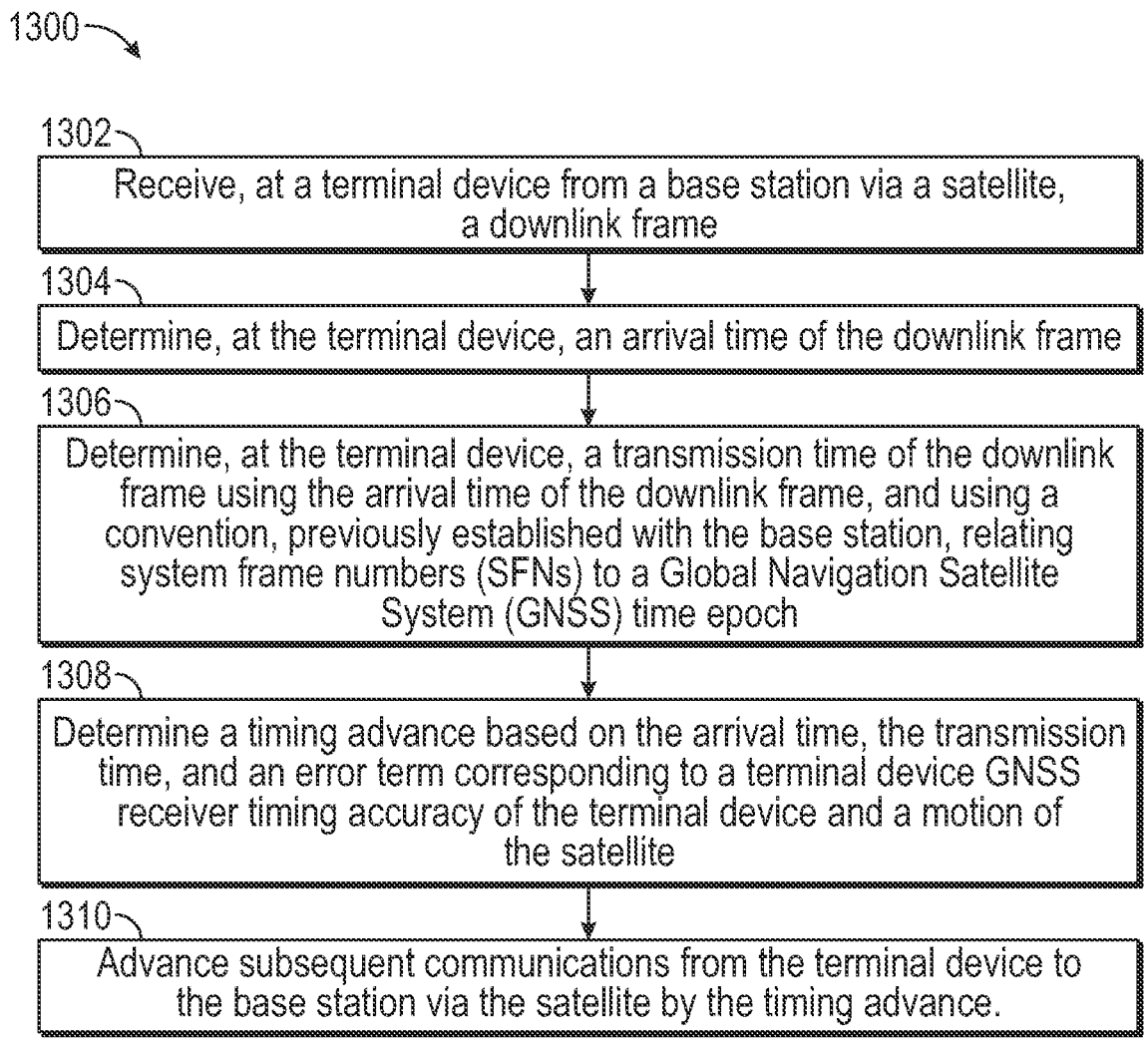
FIG. 13 is a flow diagram illustrating example GNSS-assisted operations that may be performed by a terminal device during acquisition in a satellite 4G or 5G network, according to certain aspects of the disclosure.

FIG. 13 is a flow diagram illustrating an example method 1300 (e.g., a GNSS-assisted method) that includes operations that may be performed for communication in a 4G or 5G network, according to certain aspects of the disclosure. For example, the method 1300 may be a method communication in a broadband satellite network that includes a base station, a terminal device, and a satellite. In various implementations, the satellite (e.g., satellite 110 or 210 described herein) may be a Geostationary Earth Orbit satellite, a Medium Earth Orbit satellite, a Highly Elliptical Orbit (HEO) satellite, or a Low Earth Orbit (LEO) satellite. In various implementations, the broadband satellite network may be a LTE, LTE-M, NR, eMTC, or RedCap network.

In the example of FIG. 13, at block 1302, the terminal device (also referred to herein as a UE) receives, from the base station via the satellite, a downlink frame (e.g., a frame containing a PBCH/MIB subframe). The downlink frame is transmitted from the base station at a time instance that is aligned to GNSS time, according to a convention, previously established between the terminal device and the base station relating system frame numbers (SFNs) to a GNSS time epoch (e.g., such that SFN=0 corresponds to a previously established GNSS time epoch as described herein).

At block 1304, the terminal device determines an arrival time (e.g., $t_R$) of the downlink frame (e.g., using clock functionality at the terminal device, such as, in part, using its embedded GNSS receiver provided time reference (clock)).

At block 1306, the terminal device determines a transmission time (e.g., $t_T$) of the downlink frame using the arrival time of the downlink frame, and using a convention, previously established with the base station, relating system frame numbers (SFNs) to a Global Navigation Satellite System (GNSS) time epoch. In this way, the terminal device may determine the transmission time using Global Navigation Satellite System information and/or MIB information (e.g., including global positioning system information) associated with the downlink frame. Determining the transmission time may include obtaining a system frame number (SFN) from the downlink frame, and determining the transmission time using the SFN, and a SFN-to-GNSS time epoch correspondence convention. For example, determining the transmission time using the SFN-to-GNSS time epoch correspondence convention may include determining the transmission time using a BS downlink frame transmission timing convention associated with a GNSS time (such as a GPS time) epoch.

At block 1308, the terminal device determines a timing advance based on the arrival time, the transmission time, and an error term (e.g., corresponding to a terminal device GNSS receiver timing accuracy and a motion of the satellite. For example, the error term may be defined as the terminal GNSS receiver timing accuracy and/or the satellite motion during the time interval from terminal determining timing advance to random access preamble arriving at base station. Determining the timing advance (TA) may include determining a system frame number (SFN) of the downlink frame, and deriving the transmission time using the SFN and the arrival time. The TA may be, for example, $2*(t_R - t_T - \delta)$ as discussed herein.

At block 1310, the terminal device advances subsequent communications, from the terminal device to the base station via the satellite, by the timing advance. Advancing the subsequent communications may include transmitting an acquisition signal (e.g., a PRACH preamble) from the terminal device to the base station via the satellite advanced by the timing advance.

In one or more implementations, the timing advance is a first timing advance. In one or more implementations, the method also includes performing acquisition signal processing at base station (e.g., in the same manner as in a terrestrial network) to generate a second timing advance using the received acquisition signal, and the terminal device receiving the second timing advance from the base station. The method may also include advancing subsequent communications by the terminal device with the base station via the satellite by the first timing advance and the second timing advance.

In accordance with various aspects of the subject technology, random access is provided in GNSS-independent methods or GNSS-assisted methods, such as for LEO, MEO, GEO, or HEO satellite networks, where the satellite(s) may be transparent (bent-pipe) or processing payload satellites, with either full base station (BS) or a distributed portion of a BS.

In one or more implementations, the GNSS-independent methods may include two aspects, the first aspect including a BS estimating A+B−δ, the δ accounting for error in ephemeris, and the second aspect including a BS estimating C+residual error (e.g., δ) using an algorithm that iterates over any detection and estimation algorithm used in a ground network BS. With respect the first aspect, the subject disclosure includes two alternatives, including (i) on a per beam basis, a BS dynamically adjusting its own Rx timing by 2(A+B−δ) to anticipate arrival of UE random access preambles with at least that quantity of delay, and each UE in the beam transmitting random access preambles the same as in a ground 4G or 5G networks, or (ii) a BS periodically broadcasting the most recent A+B−δ (and on a per beam basis to all UEs in the beam) and each UE in the beam adjusting its random access preamble Tx timing by twice the most recently received quantity. With respect to the second aspect, on a per beam basis, a BS may increase a guard period duration of a PRACH slot, from that defined for ground 4G or 5G to a quantity that is, or is based on, 2× the maximum differential delay of a beam plus an error value corresponding to satellite ephemeris accuracy.

In one or more implementations, the GNSS-assisted methods may include a BS aligning its Tx timing to a preset epoch in GNSS time; a UE, based in its own GNSS receiver provided time reference, estimating A+B+C−δ (or B+C−δ), accounting for error in GNSS receiver time reference, and then adjusting its random access Tx timing by twice the quantity; and the BS estimating a timing offset (i.e. a timing advance) of a received random access preamble the same as in a ground 4G or 5G network BS.

Figure 14:
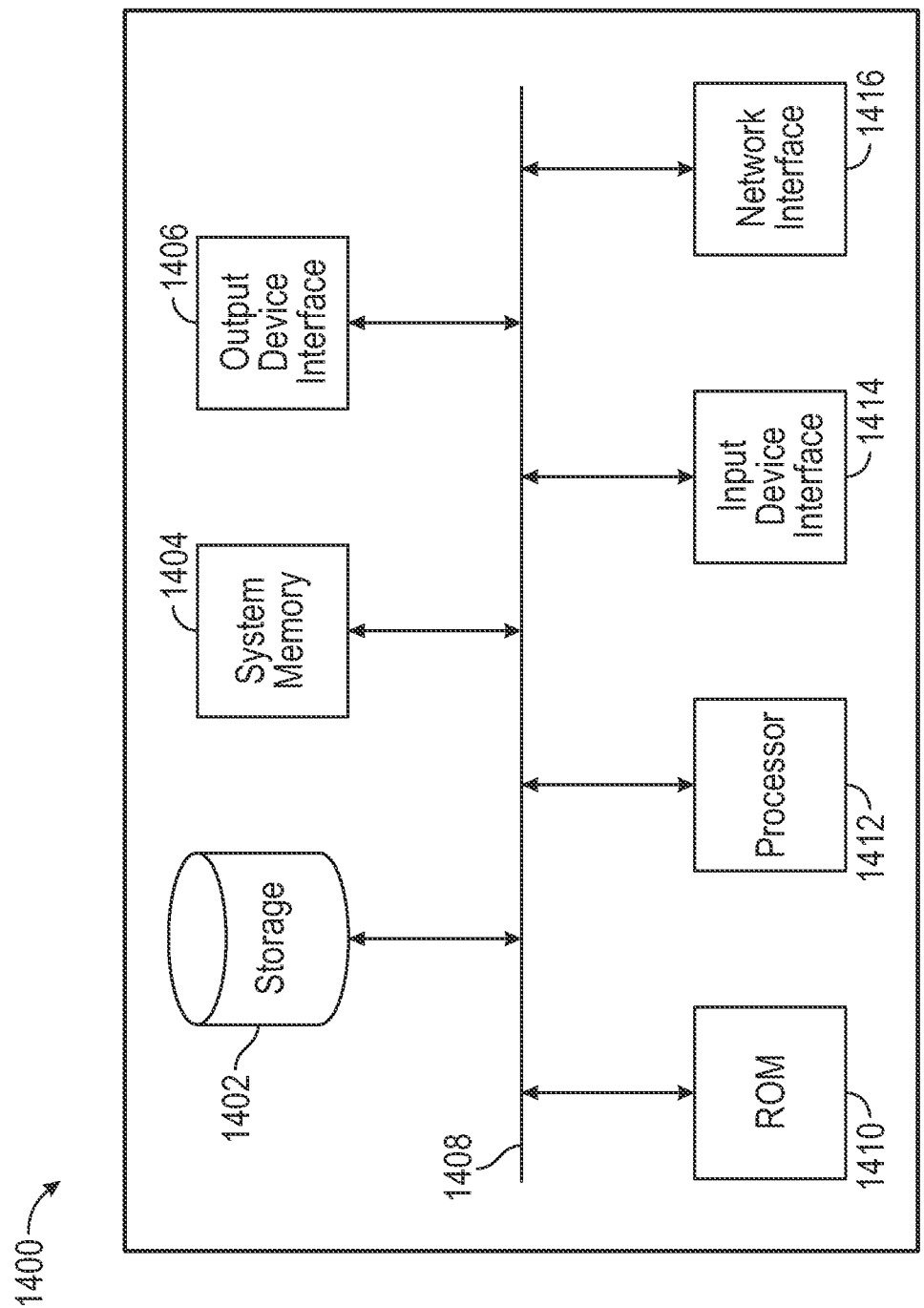
FIG. 14 is a block diagram conceptually illustrating an electronic system with which aspects of the subject technology are implemented.

FIG. 14 is a block diagram conceptually illustrating an electronic system 1400 with which aspects of the subject technology are implemented. Electronic system 1400, for example, can be a desktop computer, a laptop computer, a tablet computer, a server, a switch, a router, a base station, a portion of a base station, base station processing equipment, a core network, a receiver, a phone, a personal digital assistant (PDA), or generally any electronic device that has processing power and memory and communication capability. Such an electronic system may include various types of computer readable media and interfaces for various other types of computer readable media. Electronic system 1400 includes bus 1408, processing unit(s) 1412, system memory 1404, read-only memory (ROM) 1410, permanent storage device 1402, input device interface 1414, output device interface 1406, and network interface 1416, or subsets and variations thereof.

Bus 1408 collectively represents all system, peripheral, and chipset buses that communicatively connect the numerous internal devices of electronic system 1400. In one or more implementations, bus 1408 communicatively connects processing unit(s) 1412 with ROM 1410, system memory 1404, and permanent storage device 1402. From these various memory units, processing unit(s) 1412 retrieves instructions to execute and data to process in order to execute the processes of the subject disclosure. The processing unit(s) 1412 can be a single processor or a multi-core processor in different implementations. In some implementations, the processing unit(s) 1412 can be the communication processor of a base station such as a satellite eNodeB (eNB) or gNodeB (gNB) and perform at least some of the functionalities discussed above with respect to the methods 1100, 1200 and 1300 of FIGS. 11, 12, and 13, respectively.

ROM 1410 stores static data and instructions that are needed by processing unit(s) 1412 and other modules of the electronic system. Permanent storage device 1402, on the other hand, is a read-and-write memory device. This device is a non-volatile memory unit that stores instructions and data even when electronic system 1400 is off. One or more implementations of the subject disclosure use a mass-storage device (such as a magnetic or optical disk and its corresponding disk drive) as permanent storage device 1402.

Other implementations use a removable storage device (such as a floppy disk, flash drive, and its corresponding disk drive) as permanent storage device 1402. Like permanent storage device 1402, system memory 1404 is a read-and-write memory device. However, unlike storage device 1402, system memory 1404 is a volatile read-and-write memory, such as random access memory. System memory 1404 stores any of the instructions and data that processing unit(s) 1412 needs at runtime. In one or more implementations, the processes of the subject disclosure are stored in system memory 1404, permanent storage device 1402, and/or ROM 1410. From these various memory units, processing unit(s) 1412 retrieves instructions to execute and data to process in order to execute the processes of one or more implementations.

Bus 1408 also connects to input and output device interfaces 1414 and 1406. Input device interface 1414 enables a user to communicate information and select commands to the electronic system. Input devices used with input device interface 1414 include, for example, alphanumeric keyboards and pointing devices (also called "cursor control devices"). Output device interface 1406 enables, for example, the display of images generated by electronic system 1400. Output devices used with output device interface 1406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, bus 1408 also couples electronic system 1400 to a network (not shown) through network interface 1416. In this manner, the computer can be a part of a network of computers (such as a local area network ("LAN"), a wide area network ("WAN"), or an Intranet, or a network of networks, such as the Internet. Any or all components of electronic system 1400 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable and/or rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method for communication in a broadband satellite network comprising a base station and a satellite, the method comprising:
    determining, by the base station, a minimum delay for receipt of uplink signals from terminal devices, the minimum delay based in part on an error value corresponding to an ephemeris accuracy for the satellite;
    delaying, at the base station, uplink receive slots relative to corresponding downlink transmit slots by the minimum delay;
    receiving an acquisition signal from a particular terminal device at the base station via the satellite in one of the delayed uplink receive slots;
    determining, at the base station, a differential delay for the particular terminal device based on the received acquisition signal;
    providing the differential delay to the particular terminal device; and
    receiving subsequent communications from the particular terminal device, the subsequent communications having been transmitted advanced in time based on the differential delay provided by the base station.

2. The method of claim 1, wherein the acquisition signal includes a physical random access channel (PRACH) preamble.

3. The method of claim 2, wherein the acquisition signal is associated with a receive slot having a guard period, and wherein the guard period is extended based on a maximum differential delay and the error value.

4. The method of claim 1, wherein the satellite comprises a least a portion of the base station, and wherein the minimum delay is based on a position of the satellite, and the error value.

5. The method of claim 1, wherein the base station is a ground-based base station in communication with the satellite, and wherein the minimum delay is based on a position of the satellite, a position of the base station, and the error value.

6. The method of claim 1, wherein the satellite comprises the entire base station, and wherein the minimum delay is based on a position of the satellite and the error value.

7. The method of claim 1, wherein the minimum delay is based on a position and a geometry of a beam of the satellite.

8. The method of claim 1, wherein the satellite is a Geostationary Earth Orbit satellite, a Medium Earth Orbit satellite, a Highly Elliptical Orbit (HEO), or a Low Earth Orbit (LEO) satellite.

9. The method of claim 1, wherein determining the differential delay comprises determining which of several successive and partially overlapping observation windows, which are separated by a length corresponding to a cyclic prefix of the acquisition signal, receives the acquisition signal.

10. The method of claim 9, determining which of the several successive and partially overlapping observation windows receives the acquisition signal comprises determining which of the several overlapping observation windows is fully occupied by a PRACH preamble.

11. The method of claim 1, wherein the error value is determined to cause, for a corresponding satellite beam, the acquisition signal to arrive at the base station no earlier than a beginning of an intended receive slot at the base station.

12. The method of claim 1, wherein the ephemeris accuracy corresponds to time variation of one or more of a position of the satellite or a location and geometry of a beam with respect to the satellite and, wherein the broadband satellite network is a LTE, LTE-M, NR, eMTC, or RedCap network.

13. A method for communication in a broadband satellite network comprising a base station, a terminal device, and a satellite, the method comprising:
    receiving, at the terminal device from the base station, a quantity corresponding to a minimum delay for transmission of uplink signals from the terminal device, the minimum delay based in part on an error value corresponding to an ephemeris accuracy for the satellite;

storing the received quantity and a time of reception of the received quantity;

determining the minimum delay using the received quantity;

transmitting an acquisition signal to the base station via the satellite at a transmission time that is advanced by the minimum delay;

receiving, from the base station and responsive to the acquisition signal, a differential delay for the terminal device; and transmitting subsequent communications from the terminal device to the base station via the satellite in uplink transmit slots that are advanced by the minimum delay and the differential delay.

14. The method of claim 13, wherein the acquisition signal includes a physical random access channel (PRACH) preamble.

15. The method of claim 13, wherein the minimum delay is based on the error value subtracted from an estimated delay corresponding to a position of the satellite.

16. The method of claim 15, wherein the satellite is a Non-Geo Synchronous Orbit (NGSO) satellite, the method further comprising:

receiving an additional quantity at the terminal device from the base station, the additional quantity corresponding to a rate of change of the quantity due to motion of the NGSO satellite, and wherein determining the minimum delay using the quantity comprises determining the minimum delay using the quantity, the additional quantity, the stored time of reception of the quantity, and a transmit time for the acquisition signal.

17. The method of claim 16, wherein the base station is configured to repeatedly update and broadcast the quantity and the additional quantity.

18. The method of claim 13, wherein the quantity comprises a reduced bit quantity based on a subtraction at the base station prior to transmission of the quantity, and wherein determining the minimum delay comprises adding a value to the reduced bit quantity.

* * * * *